(12) United States Patent
Macnamara

(10) Patent No.: US 9,310,559 B2
(45) Date of Patent: Apr. 12, 2016

(54) MULTIPLE DEPTH PLANE THREE-DIMENSIONAL DISPLAY USING A WAVE GUIDE REFLECTOR ARRAY PROJECTOR

(71) Applicant: Magic Leap, Inc., Hollywood, FL (US)

(72) Inventor: John Graham Macnamara, Plantation, FL (US)

(73) Assignee: Magic Leap, Inc., Dania Beach, FL (US)

( * ) Notice: Subject to any disclaimer, the term of this patent is extended or adjusted under 35 U.S.C. 154(b) by 90 days.

(21) Appl. No.: 13/915,530

(22) Filed: Jun. 11, 2013

(65) Prior Publication Data
US 2014/0003762 A1 Jan. 2, 2014

Related U.S. Application Data

(60) Provisional application No. 61/658,355, filed on Jun. 11, 2012.

(51) Int. Cl.
*G02F 1/295* (2006.01)
*G02B 6/26* (2006.01)
*G02F 1/01* (2006.01)
*G02B 27/01* (2006.01)
*F21V 8/00* (2006.01)

(52) U.S. Cl.
CPC .............. *G02B 6/262* (2013.01); *G02B 27/017* (2013.01); *G02F 1/011* (2013.01); *G02B 6/0028* (2013.01); *G02B 6/0035* (2013.01); *G02B 6/0075* (2013.01); *G02B 6/0076* (2013.01); *G02B 6/0078* (2013.01); *G02B 2027/0127* (2013.01)

(58) Field of Classification Search
CPC ........................................................ G02B 6/262
USPC ............................................................ 385/8
See application file for complete search history.

(56) References Cited

U.S. PATENT DOCUMENTS

| 5,812,186 A | 9/1998 | Telfer et al. |
| 8,434,909 B2* | 5/2013 | Nichol et al. ............ 362/296.01 |
| 2006/0132914 A1 | 6/2006 | Weiss et al. |
| 2008/0151379 A1 | 6/2008 | Amitai |

(Continued)

OTHER PUBLICATIONS

International Search Report, mailed Aug. 28, 2013, for corresponding International Application No. PCT/US2013/045267, 3 pages.

(Continued)

*Primary Examiner* — Sung Pak
(74) *Attorney, Agent, or Firm* — Seed IP Law Group PLLC

(57) ABSTRACT

A two-dimensional array of linear wave guides includes a plurality of 2D planar wave guide assemblies, columns, sets or layers which each produce a respective depth plane to for a simulated 4D light field. Linear wave guides may have a rectangular cylindrical shape, and may stacked in rows and columns. Each linear wave guide is at least partially internally reflective, for example via at least one opposed pair of at least partially reflective planar side walls, to propagate light along a length of the wave guide. Curved micro-reflectors may reflect some modes of light while passing others. The side walls or a face may reflect some modes of light while passing others. The curved micro-reflectors of any given wave guide each contribute to spherical wave front at a defined radial distance, the various layers producing image planes at respective radial distances.

58 Claims, 26 Drawing Sheets

(56) References Cited

U.S. PATENT DOCUMENTS

2011/0227487 A1 9/2011 Nichol et al.
2011/0248904 A1 10/2011 Miyawaki et al.
2011/0255303 A1* 10/2011 Nichol et al. ................ 362/606
2014/0049983 A1* 2/2014 Nichol et al. ................ 362/610

OTHER PUBLICATIONS

Written Opinion of the International Searching Authority Report, mailed Aug. 28, 2013, for corresponding International Application No. PCT/US2013/045267, 7 pages.

* cited by examiner

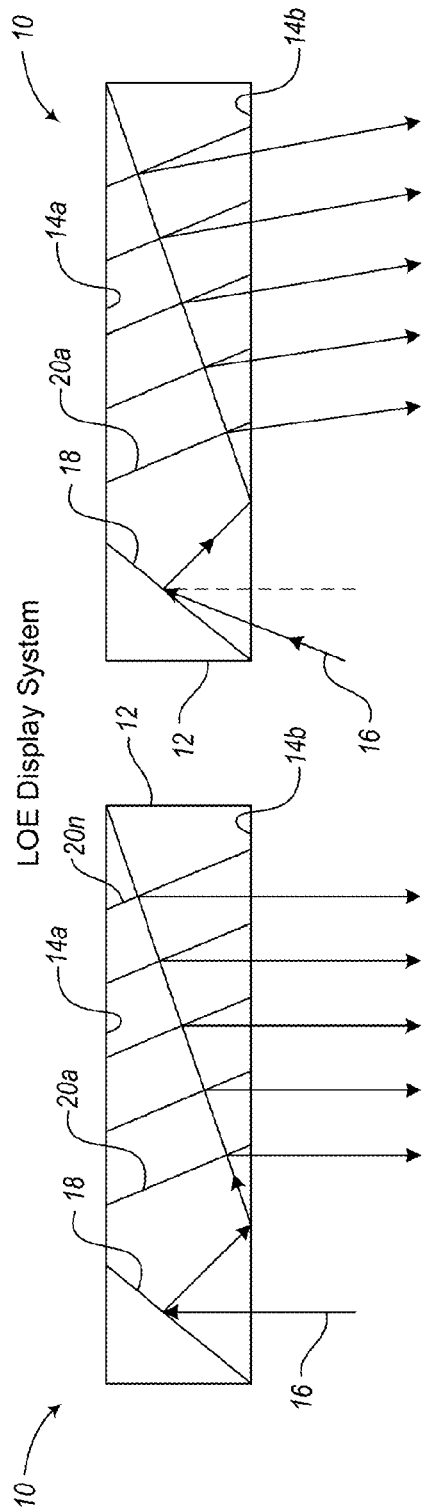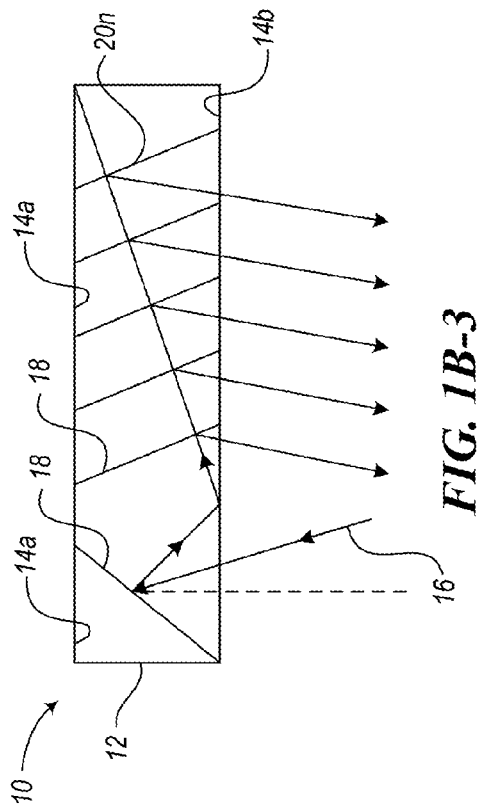
FIG. 1B-1
FIG. 1B-2
FIG. 1B-3

WRAP Display System
(Single Layer)

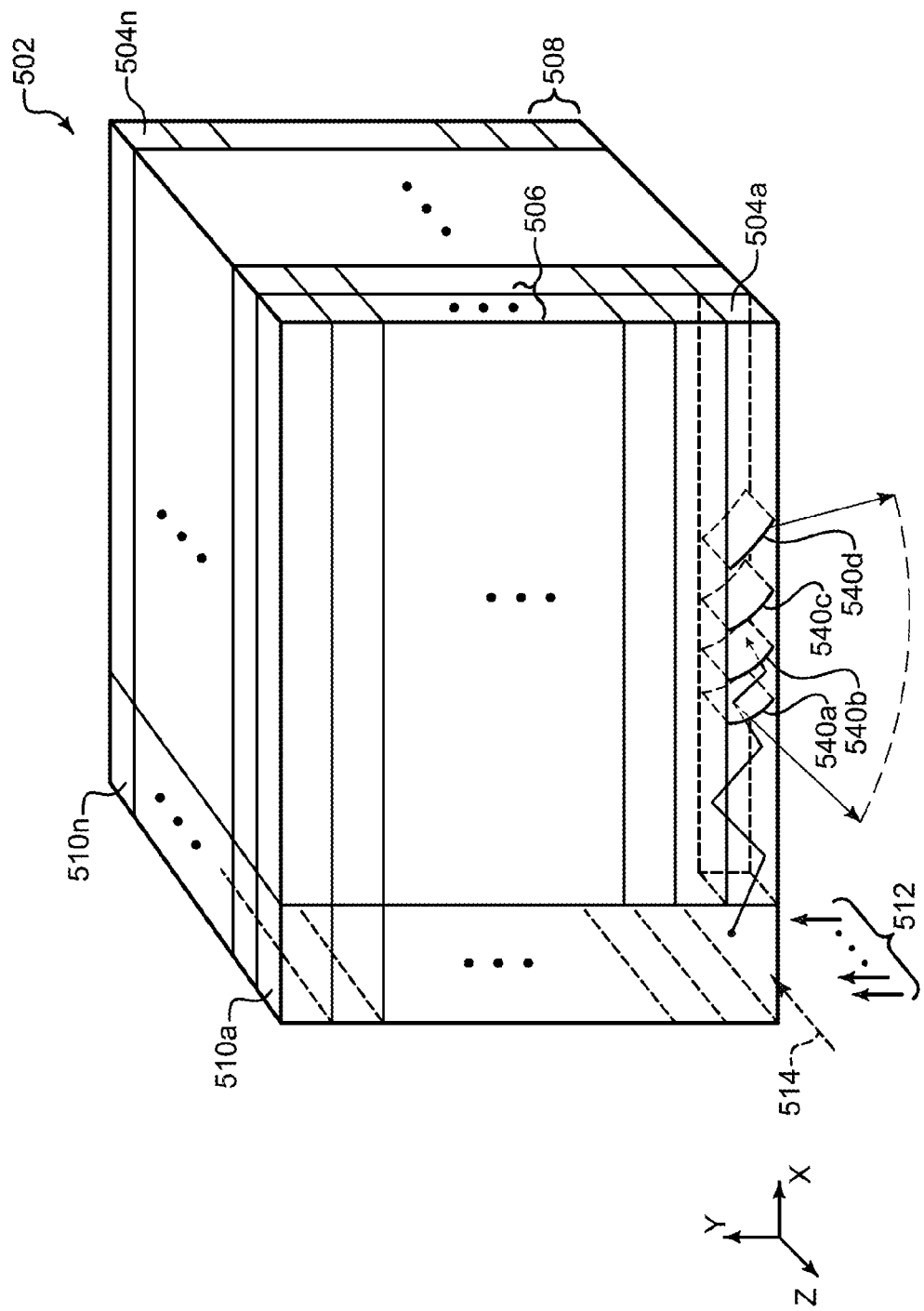

Coordinate System for 4D Light Field on Display Surface

Beam Must Be Wide Enough to Minimize Gaps in Light Beam Array

MULTIPLE DEPTH PLANE THREE-DIMENSIONAL DISPLAY USING A WAVE GUIDE REFLECTOR ARRAY PROJECTOR

BACKGROUND

A light field encompasses all the light rays at every point in space traveling in every direction. Light fields are considered four dimensional because every point in a three-dimensional space also has an associated direction, which is the fourth dimension.

Wearable three-dimensional displays may include a substrate guided optical device, also known as the light-guide optical element (LOE) system. Such devices are manufactured by, for example Lumus Ltd. As illustrated in FIGS. 1B-1, 1B-2 and 1B-3, the LOE system 10 uses a single layer wave guide 12 made of two parallel planar surfaces 14a, 14b. Light 16 is coupled into the LOE wave guide 12 using a mini-projector (not shown) and reflector strip 18. FIGS. 1B-1, 1B-2 and 1B-3 illustrate the wave guide 12 of the LOE system 10, showing light 16 entering at three respective angles, The LOE system 10 uses planar micro-reflectors 20a-20n (only two called out for sake of drawing clarity) that are only oriented along one angular direction and are positioned parallel to one another. However, the LOE system 10 only projects a single depth plane, focused at infinity, with a spherical wave front curvature of zero.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

Examples of a wave guide reflector array projector (WRAP) system are illustrated in the figures. The examples and figures are illustrative rather than limiting.

FIGS. 1B-1, 1B-2 and 1B-3 show a conventional system that uses a light-guide optical element (LOE) technology to project a single depth plane, with input light entering at three respective angles.

FIG. 5A is an isometric view of an optical apparatus in the form of an example multiple depth plane 3D display system or wave guide reflector array projector (WRAP) apparatus.

DETAILED DESCRIPTION

Figure 1A:
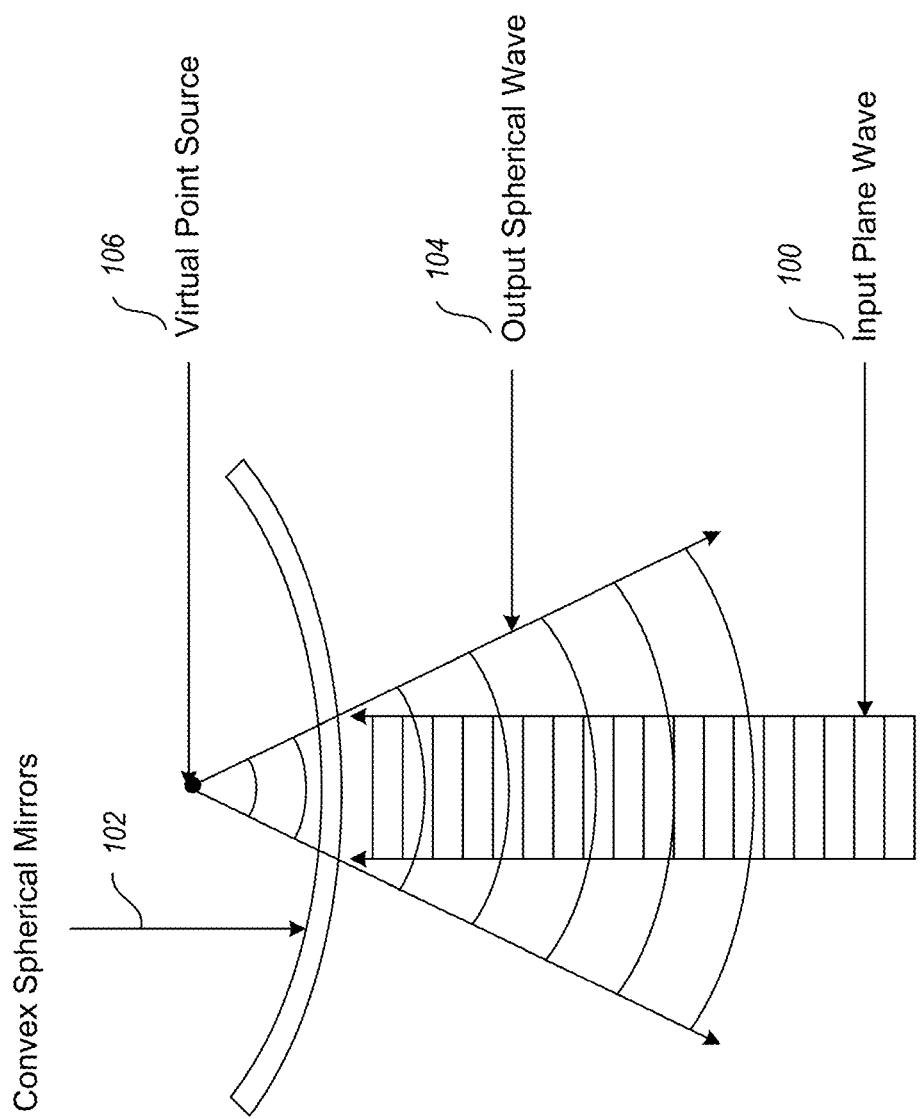
FIG. 1A shows an example convex spherical mirror that refocuses light focused at infinity at a specific radial distance.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

The ability of the humans to perceive depth of field in a scene is limited, that is, humans have limited visual resolution at different radial distances. Consequently, to recreate an object or scene so that a user experiences the full 3D effect, not every possible focal plane in the 3D volume needs to be recreated. The 3D volume can be recreated for human perception by simply reproducing a limited number of slices of a particular 3D volume. Theories as to the number of slices that need to be recreated range from less than 16 to 36 or more, where the width of the slices are thinnest for distances closer to the eye and increase with distance. The human vision system (i.e. eyes, retinal nerve, brain) focally collapses each of these planes so that additional slices of information presented are not necessary for the human to perceive the 3D volume. Independent of the actual number of slices needed, the basic assumption is that only a finite number of slices of a 3D volume need to be reproduced for a human to perceive the full 3D effect.

An optical apparatus or system may be employed to, for example, generate or project light to simulate a four dimensional (4D) light field that would be produced by light reflecting from a real three-dimensional object or scene. For example, an optical apparatus such as a wave guide reflector array projector (WRAP) apparatus or multiple depth plane three dimensional (3D) display system may generate or project multiple virtual depth planes at respective radial focal distances to simulate a 4D light field. The optical apparatus in the form of a WRAP apparatus or multiple depth plane 3D display system may, for instance, project images into each eye of a user, either directly or indirectly. When the number and radial placement of the virtual depth planes is comparable to the depth resolution of the human vision system as a function of radial distance, a discrete set of projected depth planes mimics the psycho-physical effect that is produced by a real, continuous, three dimensional object or scene.

As best illustrated in FIG. 5A, an optical apparatus in the form of a WRAP apparatus or multiple depth plane 3D display system 500 may include a 2D array 502 of a plurality of wave guides 504a-504n (collectively 504, only two called out for drawing clarity). As illustrated, each of the wave guides 504 may have a rectangular cross section taken across a length or longitudinal axis thereof (the longitudinal axis denominated herein as x axis). The wave guides 504 may be arranged in a plurality of columns 506 (e.g., xy planes, extending vertically in the view of FIG. 5A, only one called out for drawing clarity) and rows 508 (e.g., xz planes, extending horizontally in the view of FIG. 5A, only one called out for drawing clarity). The columns 506 may be characterized as two-dimensional (2D) wave guides or sets of wave guides (each identified with reference number 506). The 2D wave guides 506 may be stacked as layers, for example along a first lateral axis, denominated herein as z axis. As explained herein, each 2D planar wave guide, set of wave guides, layer or column 506 produces or generates a respective virtual depth plane at a respective distance to produce a 4D light field.

The WRAP apparatus or multiple depth plane 3D display system 500 may include one or more components to provide one or more optical paths to, or from, the wave guides 504. For example, a set of distribution wave guides 510a-510n (collectively 510, only two called out for drawing clarity). The distribution wave guides may provide an optical path to wave guides 504 in respective columns or layers 506. Also for example, in a non-multiplexed implementation, the WRAP apparatus or multiple depth plane 3D display system 500 may include a plurality of optical couplers (e.g., optical fibers) illustrated by arrows 512 (referenced collectively) that provide an optical path to respective ones of the distribution wave guides 510 (i.e., each respective column 508). Also for example, in a multiplexed implementation, the WRAP apparatus or multiple depth plane 3D display system 500 may include a single optical coupler (e.g., optical fibers) illustrated by arrow 514 that provides an optical path to two, more or all of the distribution wave guides 510. The distribution wave guides 510 and/or optical couplers 512, 514 may, for example provide input to the wave guides 504 of the 2D array 502, for instance as a pixel pattern from a source of red/green/blue (RGB) light (not illustrated in FIG. 5A.

Figure 5C:
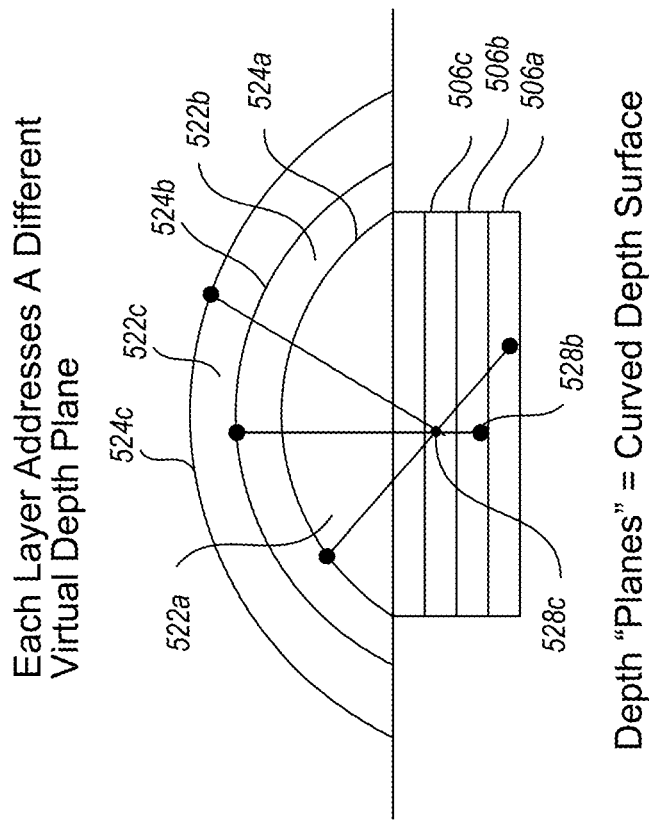
FIG. 5C is a schematic view of a portion of the optical apparatus of FIG. 5A showing a number of wave guide layers projecting light to produce respective virtual depth planes having spherical wave fronts at respective radial distances to simulate a 4D light field, according to one illustrated embodiment
Figure 5B:
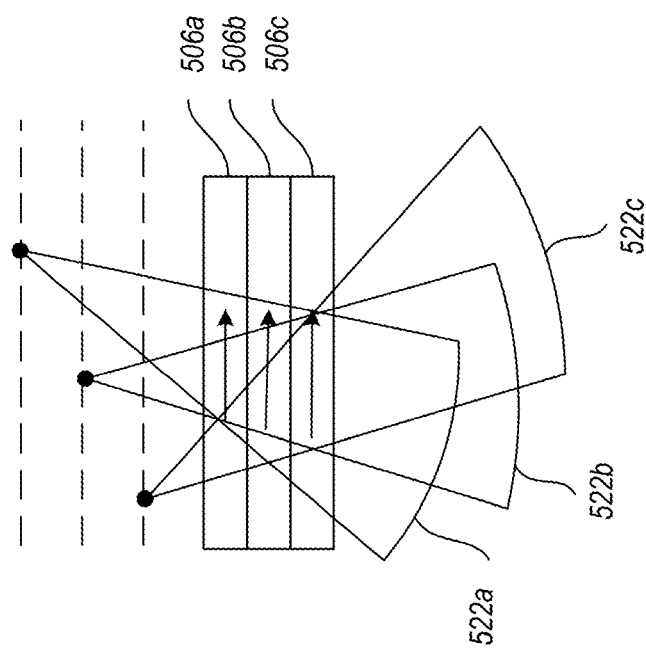
FIG. 5B is a schematic view of a portion of the optical apparatus of FIG. 5A showing a number of wave guide layers projecting light to produce respective virtual depth planes having at respective radial distances representing a number of virtual point sources to simulate a 4D light field, according to one illustrated embodiment

As best illustrated in FIGS. 5B and 5C, each column or wave guide layer 506a-506c (only three shown, collectively 506) produces a respective slice or virtual depth plane 522a-522c (only three shown, collectively 522) having a spherical wave front 524a-524c (only three shown, collectively 524) to cumulatively simulate a 4D light field 526. A position of a respective virtual point source 528a-528c (only three shown, collectively 528) for each of the virtual depth planes 522a-522c is also illustrated.

Figure 3A:
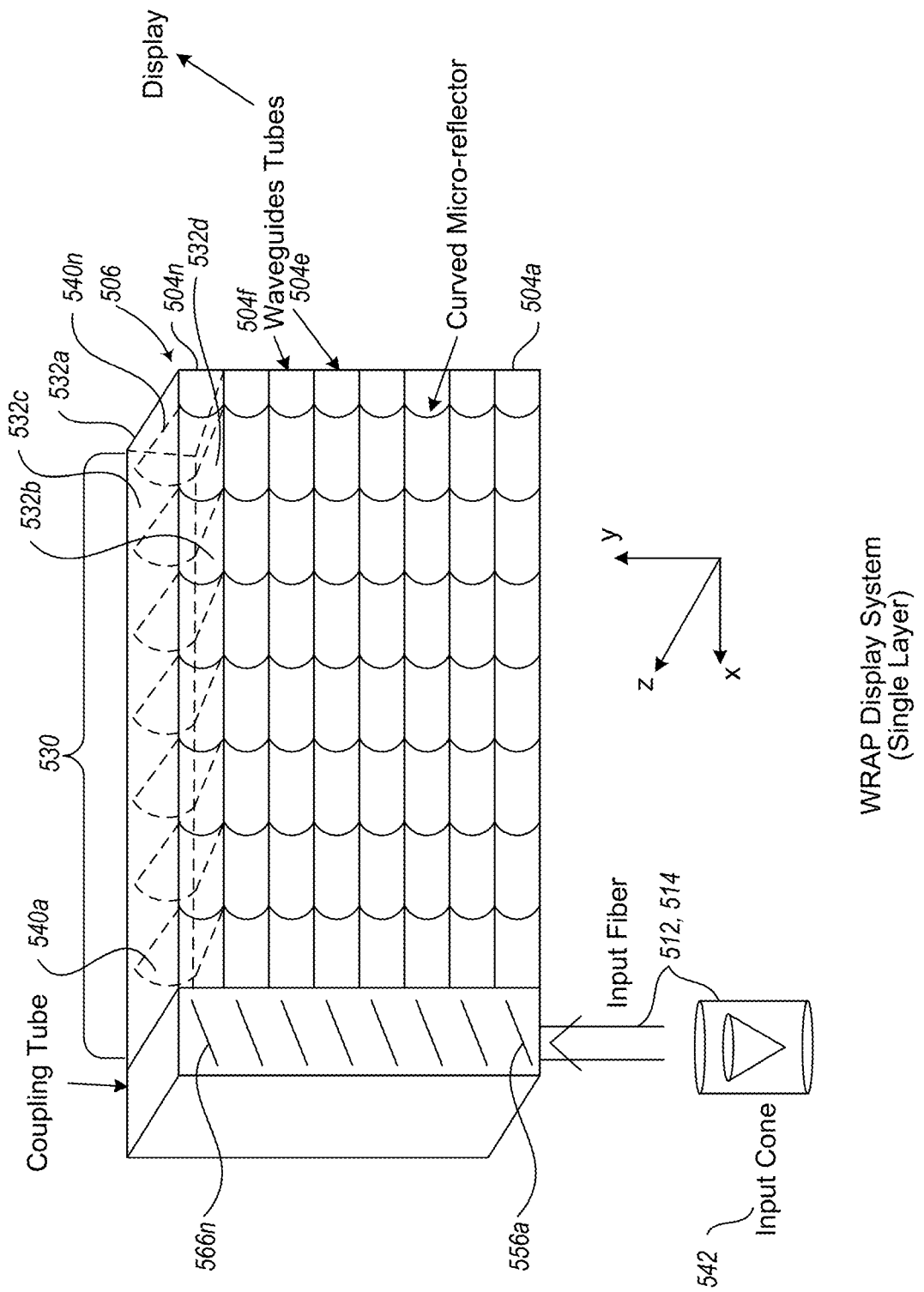
FIG. 3A shows an example layer in a wave guide reflector array projector.

FIG. 3A shows a single column, 2D planar wave guide, column, layer or set of wave guides 506, along with its respective distribution coupler 510 and an optical coupler 512, 514, according to one illustrated embodiment, Each of the 2D planar wave guides or layers 506 are comprised of a plurality of linear wave guides 504e, 504f (collectively 504, only two called out for drawing clarity). The 2D planar wave guides 506 may, for example, each include a series or linear array of rectangular cylindrical wave guides 504, sometimes referred to as wave guide tubes. While sometimes denominated as "tubes" one of skill in the art will readily appreciate that such structures do not need to be hollow, and in many implementations will be solid, similar in many respects to optical fibers but having at least one pair of opposed planar surfaces, which are at least partially internally reflective to propagate electromagnetic energy (e.g., light) along a length 530 of the wave guide 504. As explained further herein, the at least one pair of opposed planar surfaces 532a, 532b (collectively 532) may substantially internally reflect certain defined modes of light while allowing certain other defined modes of light to substantially pass out of the wave guide 504. Typically, the wave guide 504 will include two pairs of opposed planar surfaces 532a/532b, 532c/532d (collectively 532), which are partially internally reflective, for example substantially internally reflective of certain defined modes. As used herein and in the claims, the term substantially means more than 50 percent, and typically more than 85 percent or 95 percent. The wave guides 504 of the 2D planar wave guide, layer, column or set 506 may be formed individually and assembled or coupled together. Alternatively, the wave guides 504 of the 2D planar wave guide, layer, column or set 506 may be formed as a single unitary structure. Planar surfaces may facilitate production of the desired depth planes and/or increase the density of packing the wave guides 504 into a 3D structure.

Embedded, located or formed within each linear wave guide 504 is a series of deconstructed curved spherical reflectors or mirrors 540a-540n (only two of the curved micro-reflectors called out for clarity of drawing) that are designed to refocus infinity-focused light at specific radial distances. It is noted that in the interest of drawing clarity, the full micro-reflectors of a single linear array of only one of the linear wave guides 504 are fully illustrated in broken line, the micro-reflectors of other linear arrays of other linear wave guides 504 represented schematically by simple convex curves. A number of micro-reflectors 504A-504D for a single linear or rectangular wave guide 504n are represented in FIG. 5A.

FIG. 1A shows an example of how an input plane wave 100 focused at infinity can be reflected from a convex spherical mirror 102 to produce an output spherical wave 104 to represent a virtual point source 106 which appears to be located at a defined distance behind the convex spherical mirror 102. By concatenating in a (linear or rectangular) wave guide a series of micro-reflectors 540 whose shapes (e.g., radii of curvature about two axes) and orientation together project a 3D image that corresponds to a spherical wave front produced by a virtual point source at a particular x, y, z, coordinate. Each of the 2D wave guides or layers 506 provides an independent optical path relative to the other wave guides, and shapes the wave front and focuses incoming light to project a virtual depth plane 522 (FIG. 5C) that corresponds to a respective radial distance. With a sufficient number of 2D wave guides, a user viewing the projected virtual depth planes experiences a 3D effect.

A multiple layer 2D array 502 of planar wave guides 506 is described herein, in which each layer projects light that corresponds to a different virtual depth plane in the 3D volume. As explained above, FIGS. 5A-5C shows a portion of an example multiple layer WRAP display apparatus or system 500 with 2D planar wave guides, columns or sets of wave guides 506 stacked as layers. Each layer 506 includes multiple wave guides, for instance linear or rectangular wave guides 504, as shown in the example of FIG. 3A. A set of optical distribution couplers 510 and/or other optical couplers 512, 514 optically couple the linear or rectangular wave guides 504 of the 2D array 502, to other components. For instance, the optical distribution couplers 510 and/or other optical couplers 512, 514 may optically couple the linear or rectangular wave guides 504 of the 2D array 502 to a subsystem that provides pixel patterns (e.g., RGB intensity modulated pixel patterns). In some instances the set of optical couplers 510 are referred to herein and/or in the claims as a linear array of column distribution couplers or as second lateral (Y) axis distribution optical couplers, or coupling tubes. As previously noted, one of skill in the art will readily appreciate that such structure do not need to be hollow, and in many implementations will be solid, similar in many respects to optical fiber.

Figure 18:
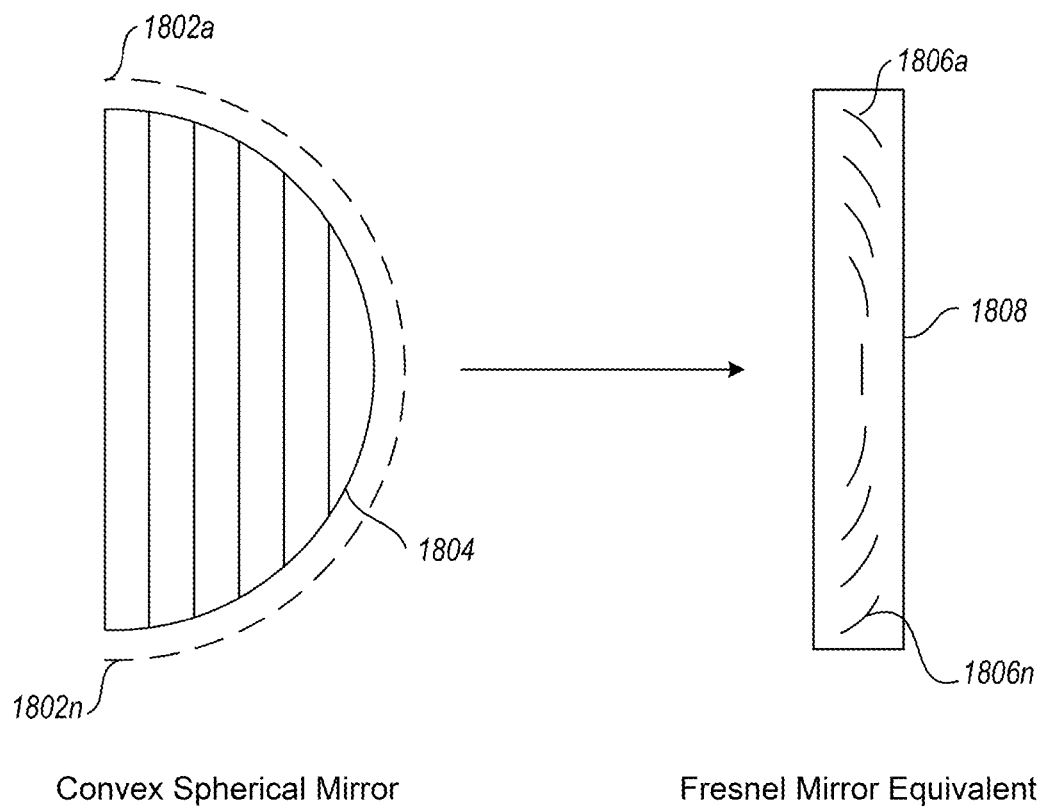
FIG. 18 illustrates an example of an array of micro-reflectors that functions similar to a side-injected Fresnel mirror.

Each individual wave guide 504 in the WRAP apparatus 500 includes a series of deconstructed curved spherical reflectors or mirrors 540 that are designed to refocus infinity-focused light at specific radial distances. A Fresnel lens is an example of a macroscopic optical element constructed from a series of optical micro-components. The WRAP apparatus 500 includes an array of micro-reflectors 540 that operate effectively as a side-injected (e.g., injected from a side denominated as the first end) Fresnel mirror. FIG. 18 illustrates an example of an array of micro-reflectors 1802a-1802n (collectively 1802, only two called out for drawing clarity) in the configuration of a portion of a sphere 1804 rather than an array of micro-reflectors 1806a-1806n (collectively 1806, only two called out for drawing clarity) in a linear configuration 1808 as would be found in the equivalent Fresnel mirror, where the orientation of the micro-reflectors 1802 in the sphere configuration 1804 matches the orientation of the micro-components or micro-reflectors 1806 of the linear Fresnel mirror configuration 1808.

What the WRAP Does

The WRAP apparatus 500 includes an array of curved micro-reflectors in the linear or rectangular wave guides 504 that comprise each of the 2D wave guides 506. The array of curved micro-reflectors are positioned and oriented to act similarly to a lens or curved mirror, to project virtual images at specified radial distances. While denominated herein and/or in the claims as "reflectors," as explained herein the curved micro-reflectors typically partially reflect and partially pass electromagnetic energy, for instance optical wavelengths of light (i.e., Near Infrared or N-IR, visible, Near Ultraviolet or N-UV). As described herein, the reflectance may be a function of an angular mode of the electromagnetic energy or light.

Conventional lens-based imaging systems or curved mirror-based imaging systems use optical elements with large surface curvatures. Conventional lens-based imaging systems or curved mirror-based imaging systems are front- or back-injected, typically by a wide light field from a projector element. Such conventional systems tend to be relatively thick and heavy, and often use multiple optical elements and moving parts to vary their focal lengths. In contrast, the illustrated 2D array 502 (FIG. 5A) of linear wave guides 504 of the WRAP apparatus 500 has a planar surface. The illustrated 2D array 502 of linear wave guides 504 of the WRAP apparatus 500 may be side-injected (i.e., injected into side denominated herein and in the claims as a first end) by a cone 542 (FIG. 3A) of narrow angled beams from an optical fiber which are then internally multiplied into a wide light field. The illustrated 2D array 502 of linear wave guides 504 of the WRAP apparatus 500 may be can be made very thin and light. The illustrated 2D planar wave guides or layers 506 may be easily stacked to create a multifocal display in which each 2D planar wave guide, layer, column or set 506 provides optical paths independently of other 2D planar wave guides, layers, columns or sets, for example allowing each to provide a respective focal or depth plane in a 3D image.

In contrast to the LOE system 10 (FIGS. 1B-1, 1B-2, 1B-3) described above, in one embodiment, the WRAP apparatus 500 projects multiple depth planes 522 (FIG. 5C), each focused at a different radial distance with the corresponding spherical wave front curvatures 524 (FIG. 5C). The WRAP apparatus 500 may include a series of linear or rectangular cylindrical wave guides arranged in vertical (xy) columns to create a planar 2D wave guide 506, which is some instances may be referred to as a 2D assembly of linear or rectangular wave guides 503. The WRAP apparatus 500 may include multiple 2D planar wave guides, columns, layers or sets 506, each corresponding to a different virtual depth plane 522 (FIG. 5C). The WRAP apparatus 500 may use convex spherically curved micro-reflectors 540 (FIGS. 3A and 5A). The micro-reflectors 540 may have one or more surface curvatures, and the surface curvatures may vary in each wave guide layer 506. As best illustrated in FIGS. 3B and 3C, each of the micro-reflectors 540 may be oriented along two angular directions $\phi$, $\theta$. The angular directions $\phi$, $\theta$ may vary in any given linear wave guide 504 or may vary between linear wave guides 504 in a single layer 506 or between different layers 506.

Figure 8:
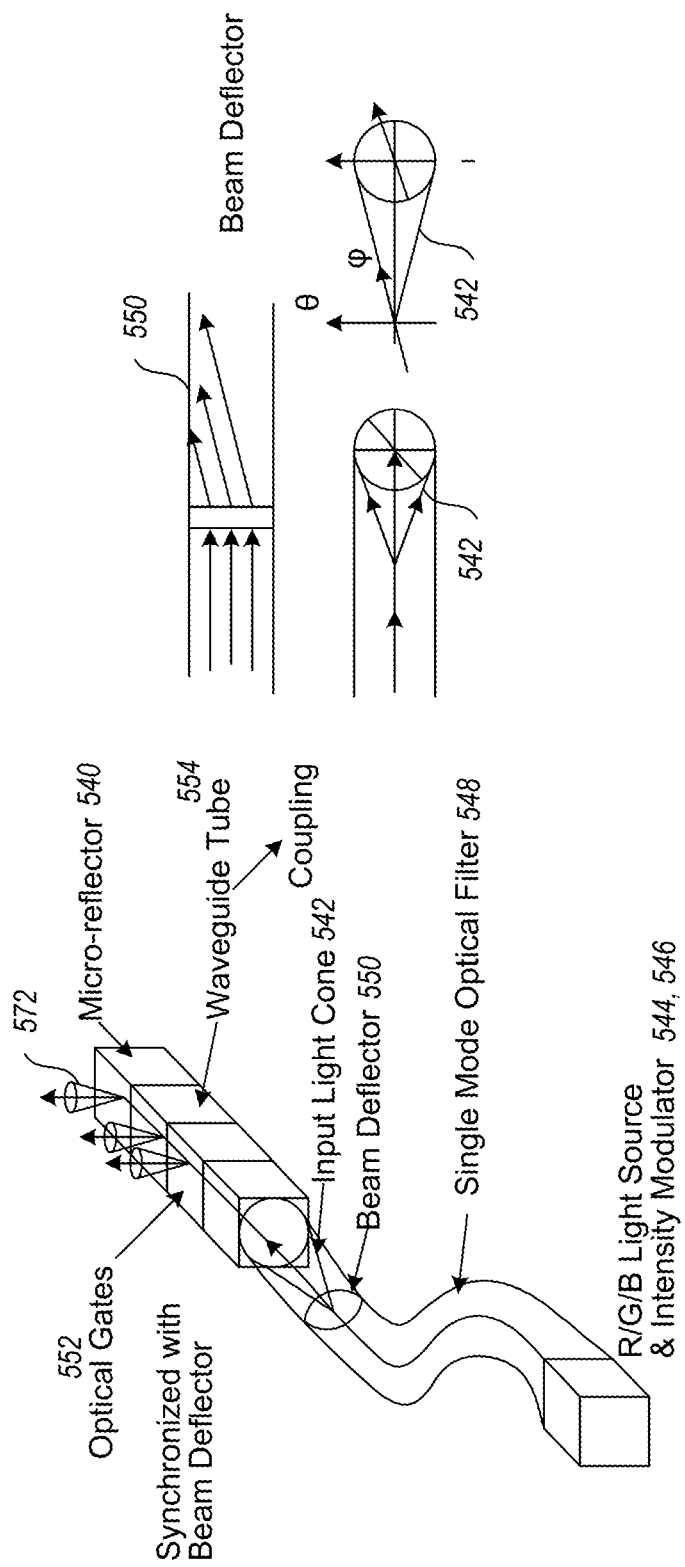
FIG. 8 shows an example of a multiple layer multiplexing system with a z-axis coupling tube equipped with optical gates.

As best illustrated in FIG. 8, light (e.g., pixel pattern) may be coupled to the 2D array 503 of the WRAP apparatus 500 from one or more RGB (red, green, blue) light sources 544, for example via one or more of a light intensity modulator 546, fiber optic cables 548, angular mode modulator or beam deflector 550, optional optical demultiplexing switch for instance implemented via optical gates 552, optional z-axis coupling array 554, and the previously described and illustrated separate set of y-axis optical couplers or optical coupling array 510.

What the WRAP Is

A WRAP apparatus 500 may include a stack of thin, planar, 2D wave guides 506 that are themselves made up of horizontal rows of linear or rectangular cylindrical wave guides 504. While denominated as 2D, the 2D wave guides 506 physically have depth, but are denominated as such since each represents a 2D slice or portion (i.e., column) of the 2D array 502. While denominated as a 2D, the 2D array of wave guides physically have a length, but are denominated as such since the length is an inherent property of the individual linear or rectangular wave guides 504 which may up the 2D array 502, Likewise, while sometimes referred to as a linear wave guide 504, these wave guides physically have heights and widths, but are denominated as such since each provides a linear optical path.

FIG. 3A shows an example single layer of the 2D array 503 of a WRAP apparatus 500. An input cone 542 of light is directed via an optical fiber 512, 514, 548 into a distribution optical coupler or y-axis optical coupler 510, sometimes referred to herein as a coupling tube (oriented vertically in FIG. 3A). Mounted in a row within the optical coupler 510 are a number of multiple beam splitters 556a-556n (collectively 556, only two called out in interest of drawing clarity). Each beam splitter 556v reflects a first portion of the light incident upon it to one of multiple stacked linear or rectangular wave guides 504 (oriented horizontally in FIG. 3A), and transmits a second portion of light to the next beam splitter 556. Thus, light incident into the distribution optical coupler or y-axis optical coupler 510 is emitted into multiple linear or rectangular wave guides 504 positioned along at least a portion of a length of the distribution optical coupler or y-axis optical coupler 510.

As previously explained, embedded, positioned or formed in each linear or rectangular wave guide 504 is a linear array of curved micro-reflectors 540 that are shaped and angularly oriented such that each angled light beam that is guided through the linear or rectangular wave guide 504 is projected from the linear or rectangular wave guide 504 by the micro-reflectors 540 into a three dimensional curved pattern. FIG. 3B shows example orientation angles φ, θ of micro-reflectors 540 in a wave guide, where the micro-reflectors are represented in planar form for ease if illustration. FIG. 3C shows an example of orientation angles φ, θ for a curved micro-reflector 540. The projected pattern corresponds to the spherical wave front that is produced by a virtual point source placed at a given x,y,z coordinate, with the x and y coordinates being determined by the 2D angular orientation of the light beam, and the z-coordinate being determined by the particular configuration of micro-reflector shapes and 2D orientation gradients in a given 2D planar wave guide, column, layer or set 506. Each 2D planar wave guide, column, layer or set 506 is configured to have different wave front shaping and focusing properties such that each layer projects a virtual depth plane corresponding to a different z-coordinate, or radial coordinate (r-coordinate).

A point source of light that is placed at a given x,y,z coordinate produces a radiating three dimensional pattern of light that varies in a very specific way throughout three dimensional space. Specifically, the point source generates a spherical wave front whose surface curvature varies in inverse proportion to the radius of the radiating sphere. The WRAP apparatus 500 is designed to generate a section of this sphere with the appropriate wave front curvature and two dimensional rotation, for a particular z-coordinate, upon receiving the input ray that corresponds to a given x, y coordinate.

How the WRAP Works

As shown in the example of FIG. 3A, light input to each WRAP 2D planar wave guide, column, layer or set 506 may be provided via a separate multi-mode optical fiber 512 into which a small cone 542 of light has been injected. Alternatively, light input to each 2D planar wave guide, column, layer or set 506 is in the form of the light cone 542 via a respective output channel 514 of a demultiplexing switch 552 (FIG. 8). The light cone 542 contains a two dimensional angular distribution of light beams that corresponds to the two dimensional x, y light intensity pattern that is present in a single depth plane of a 3D volume to be re-created. There are a number of ways to couple the angular distribution of the light cone into the input fiber, such as using a MEMS scanner, a switchable liquid crystal, or a MEMS diffraction grating.

Figure 6:
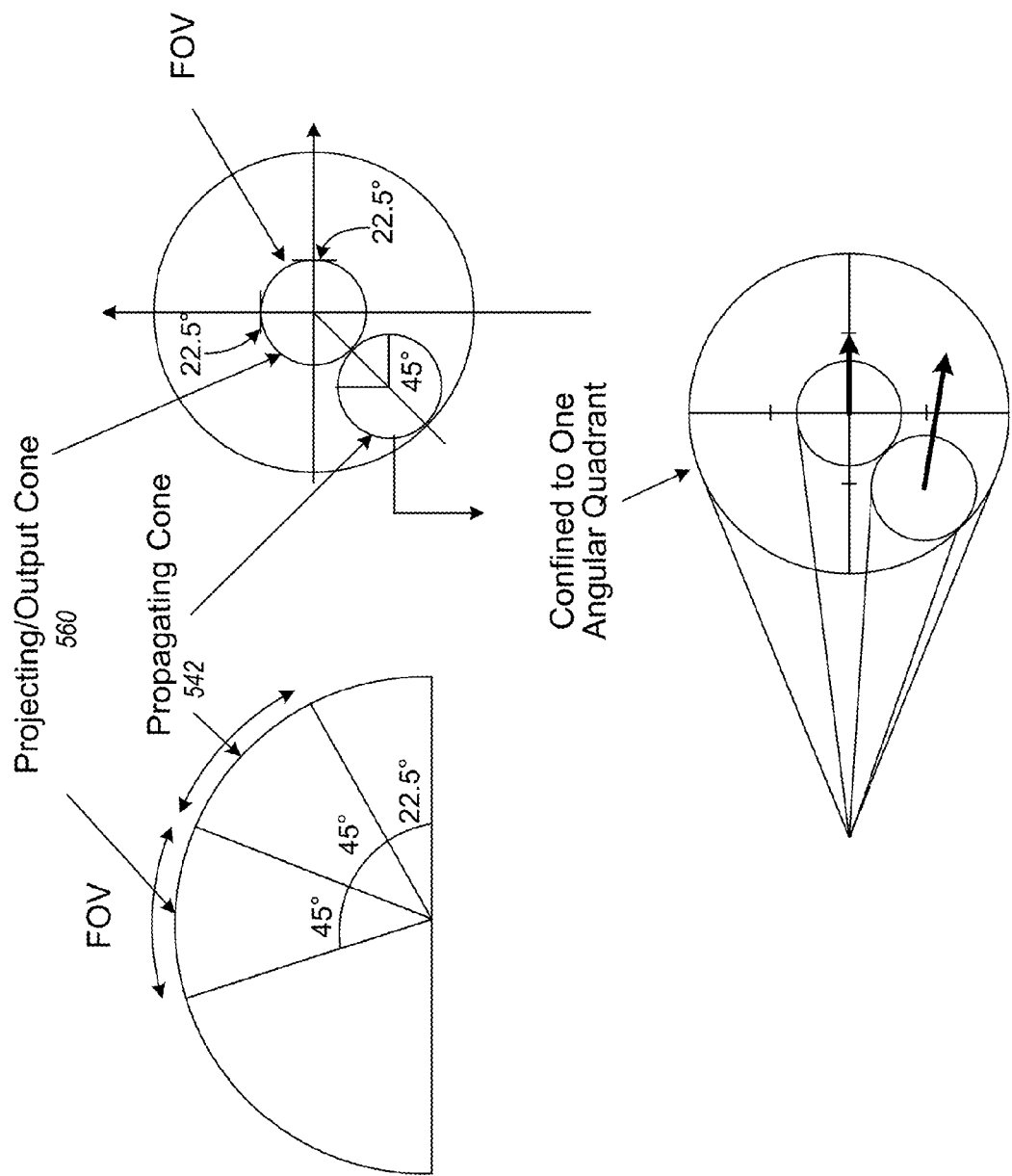
FIG. 6 shows example projection and propagation light cones for a WRAP system.

The propagating light cone 542 should have a defined or known angular pattern, for example as shown in the example of FIG. 6. In some embodiments, the light cone 542 that propagates inside of the linear or rectangular wave guide 504 should lie approximately in the angular range of −22.5 degrees to −67.5 degrees, in both angular directions, and the light cone 560 that is projected out of the wave guide should lie approximately in the angular range of −22.5 degrees to +22.5 degrees, in both angular directions. Notably, on a relatively narrow range of ray angles will propagate in the wave guide, thus the angular range of the input image should be limited accordingly. Light that is propagated outside of these angular ranges will produce aliasing and double images.

There are two ways to drive the 2D planar wave guide, column, set or multiple layers 506 of the 2D array 502, in parallel or in series. In the parallel method (shown in the example of FIG. 5A), each wave guide layer 506 is driven by a different multi-mode fiber 512 that propagates an angular pattern corresponding to that portion of the visual field which is contained in a particular depth layer volume. These angular patterns are generated by drive electronics (e.g., RGB light source, intensity modulator) that are located in a base unit and then sent to the 2D array 502 in parallel over multiple multi-mode fibers 512. For example, 2D images can be angularly encoded using a scanning projector system (such as the scanning fiber projector) or by coupling a 2D micro-projector to a pinhole aperture.

In the series method (shown in the example of FIG. 8), the angular pattern for the entire visual field is simultaneously created and sorted amongst the different wave guide layers 506, one angular beam at a time, using optical gates 552 that are synchronized with a 2D beam deflector 550 that creates the pattern. Because this process takes place at the 2D array 502, distribution or y-axis optical coupler 510 and/or z-axis optical coupler 562 (FIG. 9), and not in a base unit, it can be driven by a single single-mode fiber 514. In this system, input images are angularly encoded such that each resolvable angle that propagates through a fiber or other wave guide 514 corresponds to an intensity of a single object point. To encode an image in this way, multi-mode fibers 514 and optical couplers 514, 562 are used that are able to propagate numerous angular modes with an angular density that is comparable to the linear resolution of the display. The angular range of the light cone corresponds to the maximum field of view of the optical apparatus 500, for example, 45 degrees.

Figure 9:
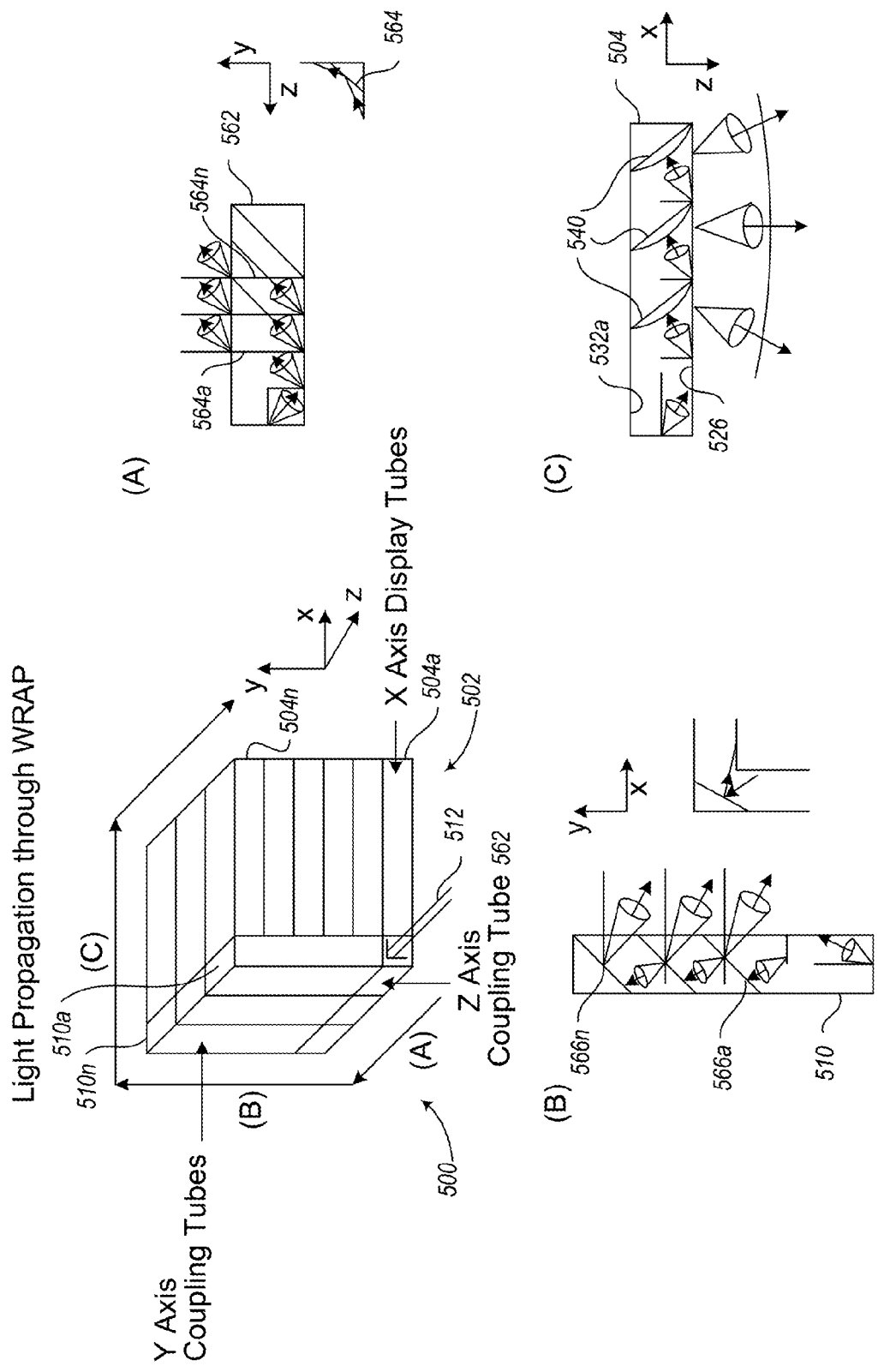
FIG. 9 shows an example illustration of light propagation through a WRAP system.

FIG. 9 shows an example illustration of light propagation through a portion of a WRAP apparatus which includes a z-axis optical coupler 562. FIG. 9 represents the relative orientations of the z-axis optical coupler 562, the distribution or y-axis optical coupler 510, and the linear or rectangular wave guides (interchangeably referred to as x-axis wave guides) 504. In the embodiment of FIG. 9, light initially enters via the z-axis optical coupler 562. The z-axis optical coupler may be similar in many respects to the linear or rectangular wave guides, for example having at least one pair of opposed planar sides that provide at least partial internal reflection to propagate or guide light along a length of the z-axis optical coupler 562. The z-axis optical coupler 562 contains a linear array of angled, planar micro-reflectors 564a-564n (collectively 564) that multiply and inject copies of the incoming angular distribution of light into each of the distribution or y-axis optical couplers 510 of the various columns, sets or layers 506. The distribution or y-axis optical couplers 510 may be similar in construction to the z-axis optical coupler 562, having a linear array of angled, planar micro-reflectors 566a-566n (collectively 566). The distribution or y-axis optical couplers 510 multiplies and injects copies of the incoming angular distribution of light into each of the x-axis wave guides 504 in the respective column, set or layer 506.

Figure 2A:
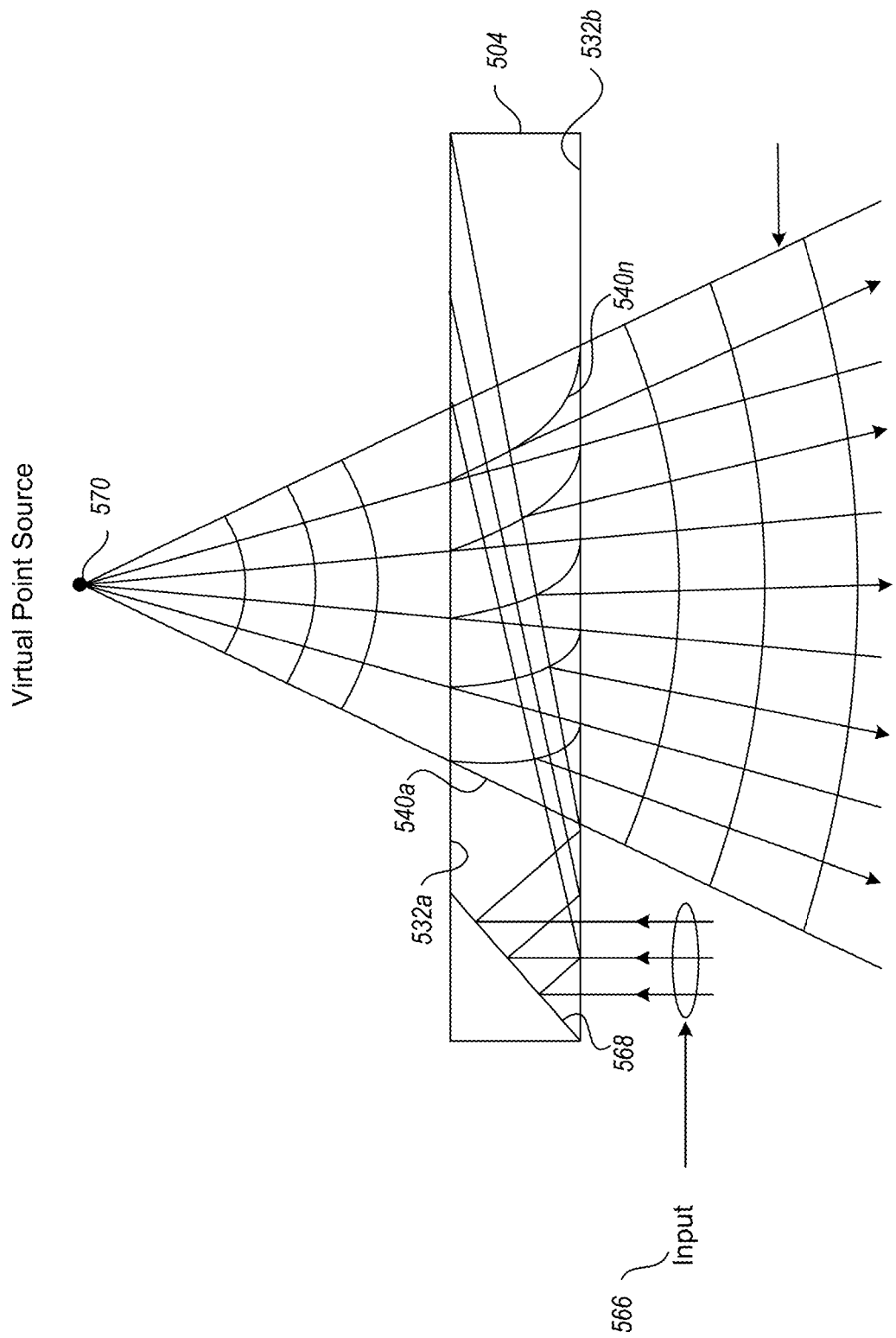
FIG. 2A is an illustration of example curved micro-reflectors that are used to produce a spherical wave front that appears to radiate from a virtual point source.
Figure 2B:
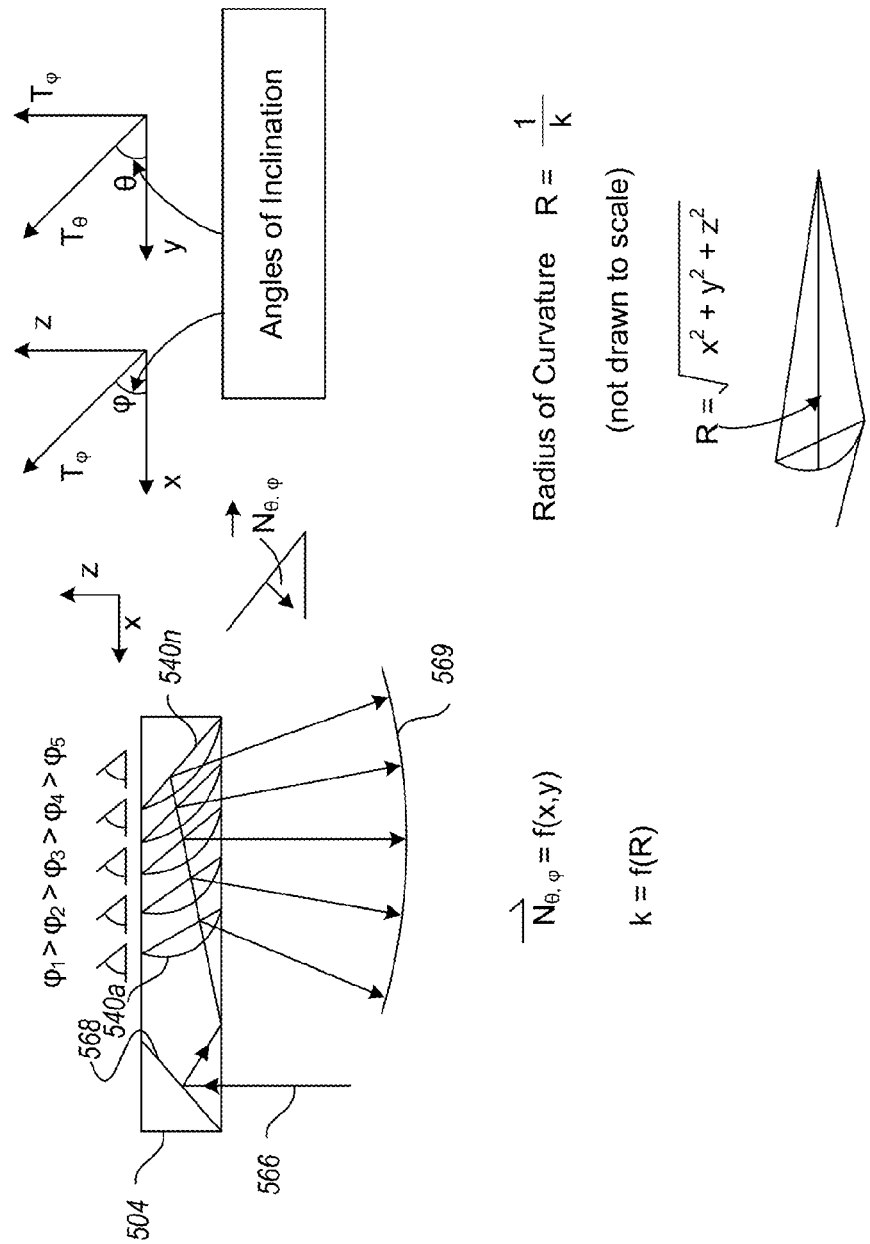
FIG. 2B shows example relative orientation angles of micro-reflectors in a wave guide.
Figure 3B:
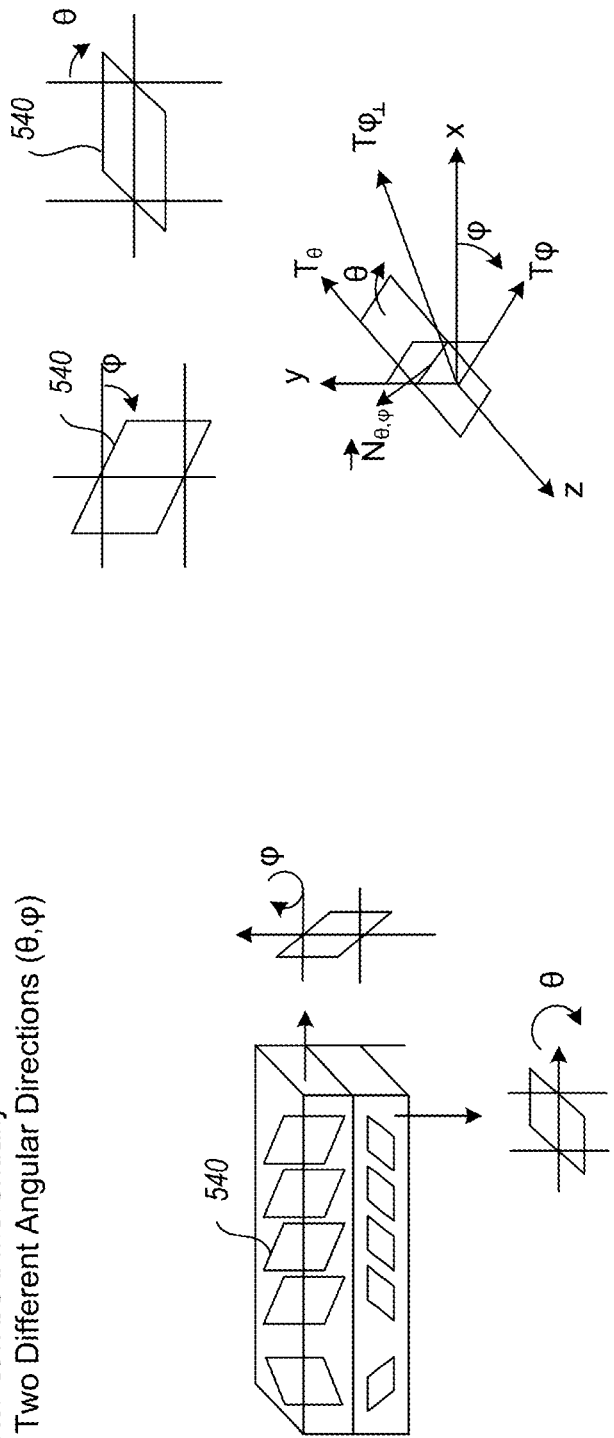
FIG. 3B shows example orientation angles of micro-reflectors in a wave guide.
Figure 3C:
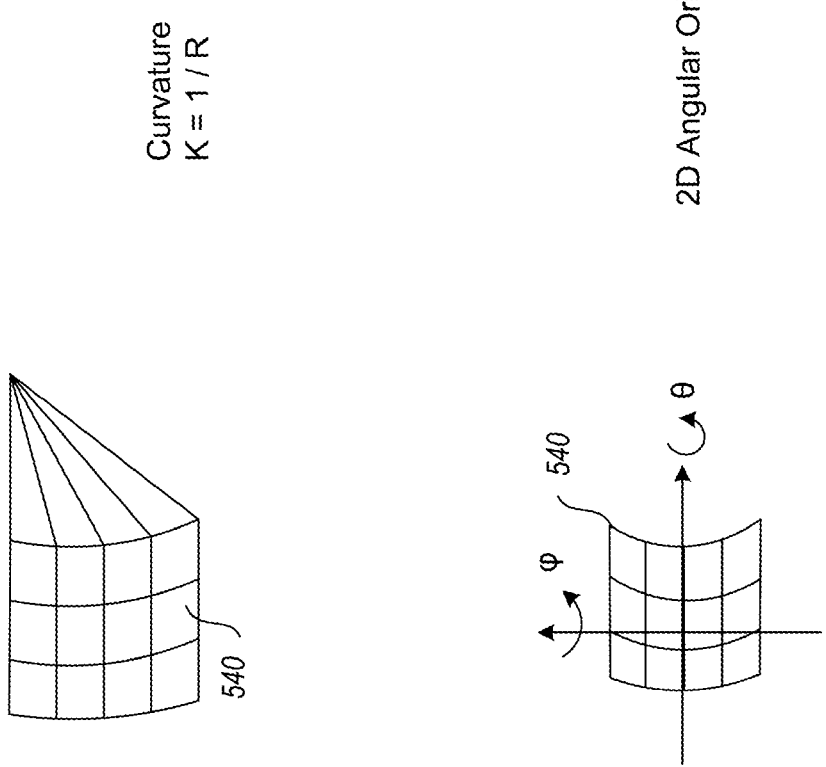
FIG. 3C shows an example curved micro-reflector.
Figure 13:
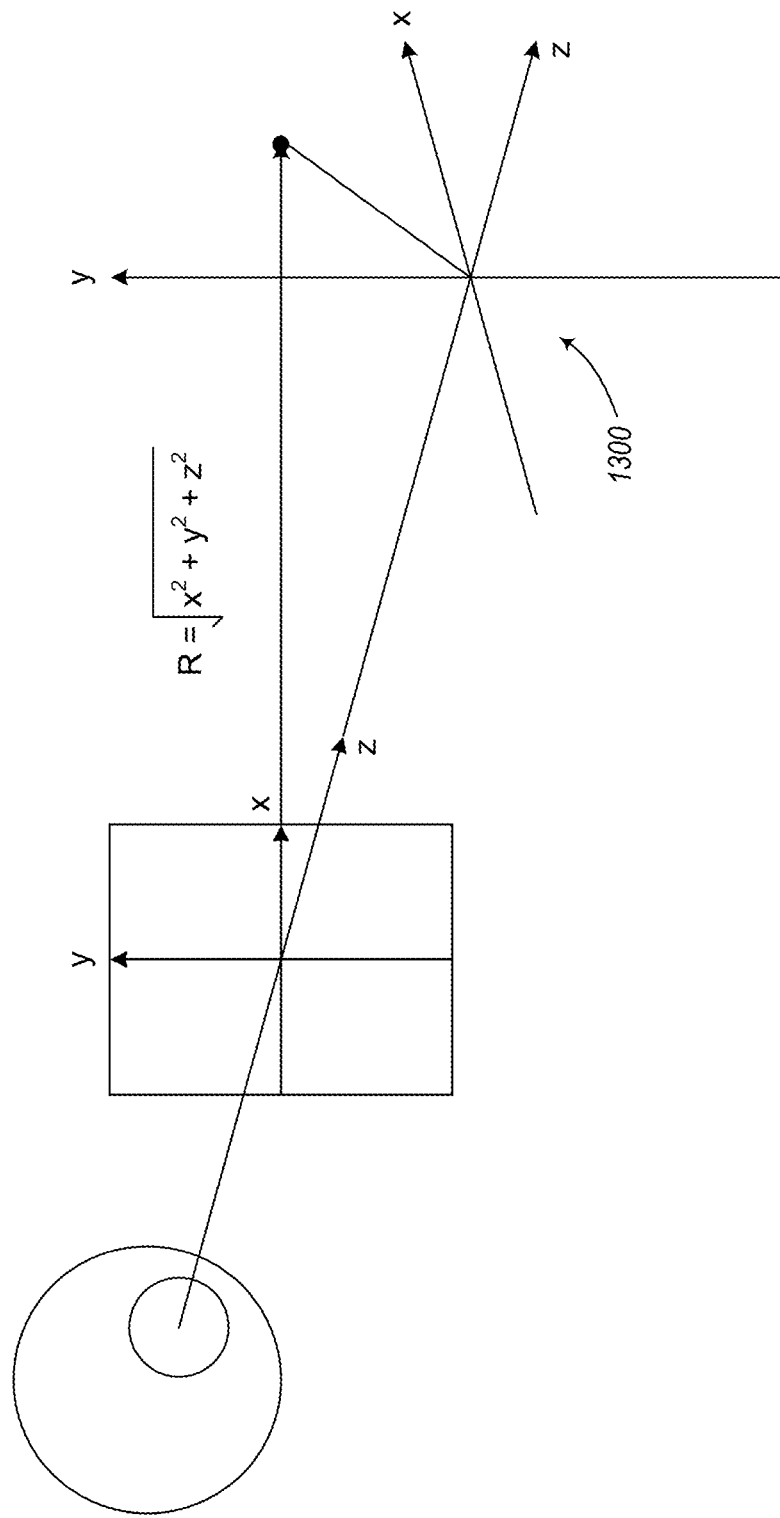
FIG. 13 shows a coordinate system for virtual object points.
Figure 14:
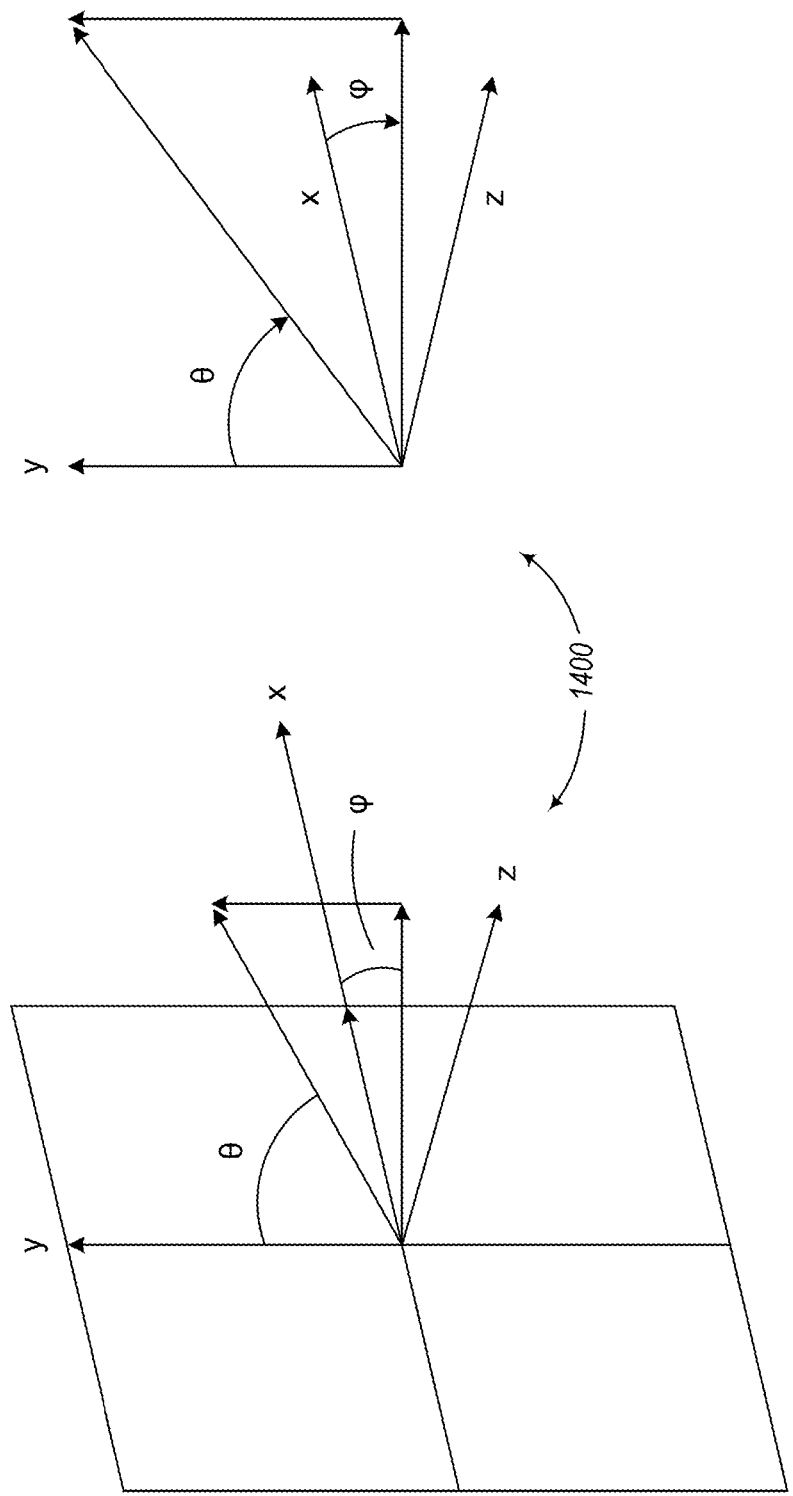
FIG. 14 shows a coordinate system for a 4D light field on a display surface.
Figure 15:
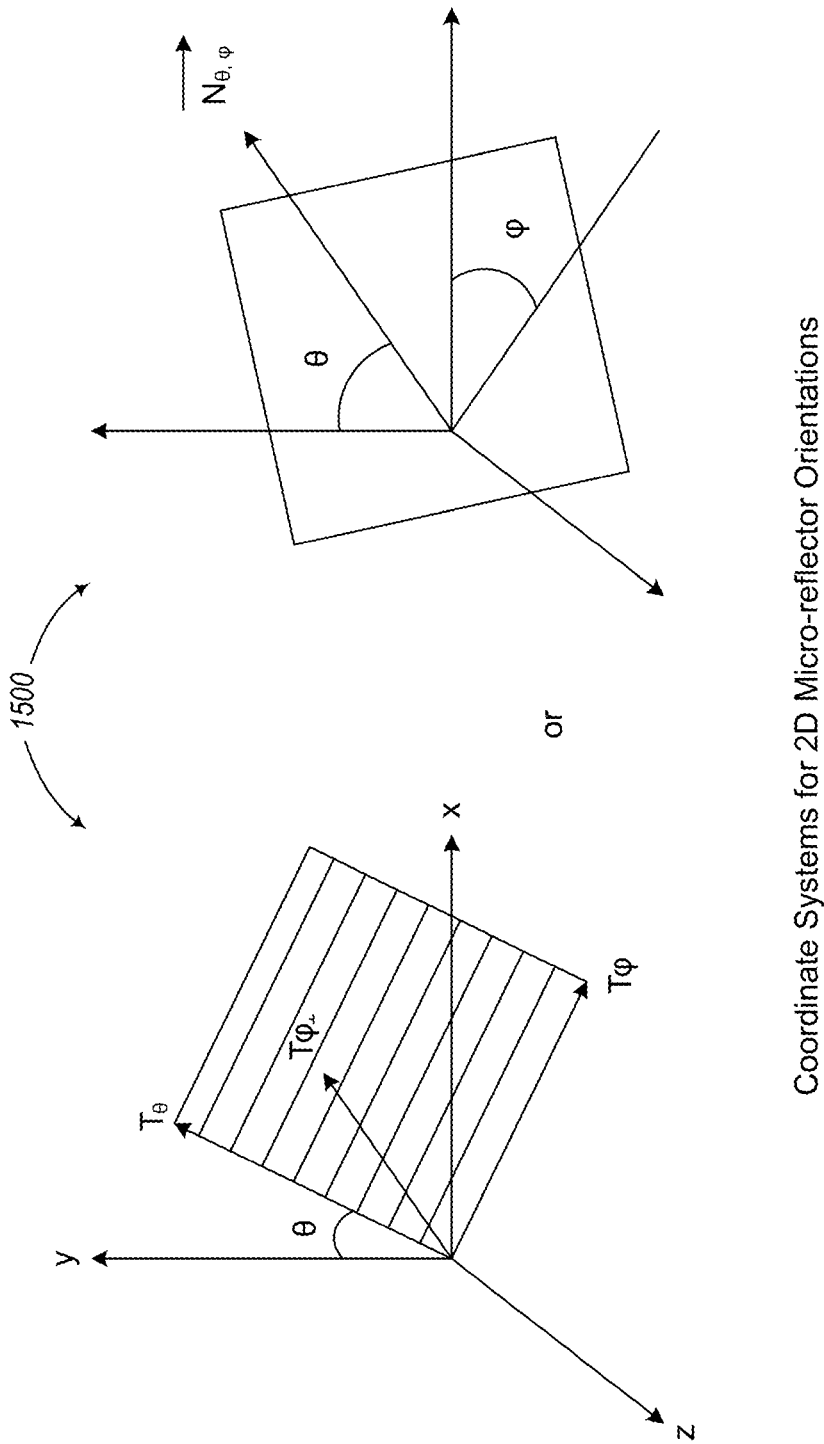
FIG. 15 shows a coordinate system for two-dimensional micro-reflector orientations.

As shown in FIG. 2A, narrow, angled, plane wave light beam 566 enters the linear or rectangular wave guide 504, reflecting from a planar reflector 568 toward at least one of the opposed reflective surfaces 532. When each narrow, angled, plane wave light beam propagates through the wave guide and strikes a curved micro-reflector 540, the plane wave light beam is split into two beams. Also as shown in FIG. 2A, a first beam continues to the next micro-reflector 540, and a second beam is reflected in a divergent pattern with a curvature that is twice as great as that of a surface of the micro-reflector 540 from which the second beam reflected. In other words, a narrow incident plane wave is converted into a small wedge-like section of a spherical wave front that has a 2D orientation that corresponds to that of the incident plane wave. If the 2D orientations of all of the curved micro-reflectors 540 in a 2D wave guide, column, set or layer 506 are varied in a very precise way, all of the spherical wave front wedges that are projected from each micro-reflector 540 can be aligned into a single spherical wave front 569 that appears to be radiating from a virtual point 570 located at the x and y coordinates that correspond to the 2D orientation of the plane wave 566 and the z-coordinate that corresponds to the curvature(s) of the micro-reflector 540 and 2D orientation gradient of the 2D wave guide, column, set or layer 506, as shown in FIG. 2B. For reference, FIGS. 13-15 show coordinate systems for virtual object points, a 4D light field on a display surface, and 2D micro-reflector orientations, respectively.

As all of the angled, plane wave light beams in an input cone propagate throughout a 2D wave guide, plane, set or layer 506, the beams recreate the superposed light field that is produced by a single depth plane. When all of the input signals for each 2D wave guide, plane, set or layer 506 propagate throughout the 2D array 502 they reproduce the superposed light field that is generated by multiple depth plane volumes. If these depth planes are sufficiently numerous and have the appropriate thicknesses as a function of their radial distance (as determined by the depth of field equation), such that if the depth planes meet or exceed the limits of human z-coordinate resolution (as well as x, y coordinate resolution), then the light field that is generated from a virtual 3D volume should be indistinguishable to a human from that of a real, physical, three dimensional space.

Because of the unique optical properties of the materials that are used in the optical system 500 (as described herein) each 2D wave guide, plane, set or layer 506 is mutually unaffected by the other 2D wave guide, plane, set or layers 506. This feature allows the 2D wave guide, plane, set or layers 506 to be stacked on top of each other to create a multifocal optical system, a feature which is not believe to be possible with conventional lenses.

Additionally, orthogonal light polarization can be used to decouple light from the real outside world from that of the virtual display to create an augmented reality multiple depth plane 3D display. Polarized reflectors 540 only reflect that portion of light which is aligned parallel to the axis of polarization of the reflector. Cross polarized light is not reflected by the reflector 540, and in the case of a semi-transparent reflector 540, would simply pass through the reflector without being reflected. In this way, a 2D wave guide, plane, set or layer 506 can be made transparent to light from the outside world or to other 2D wave guide, plane, set or layers 506 simply by cross polarizing the 2D wave guide, plane, set or layer's 506 light.

Figure 16:
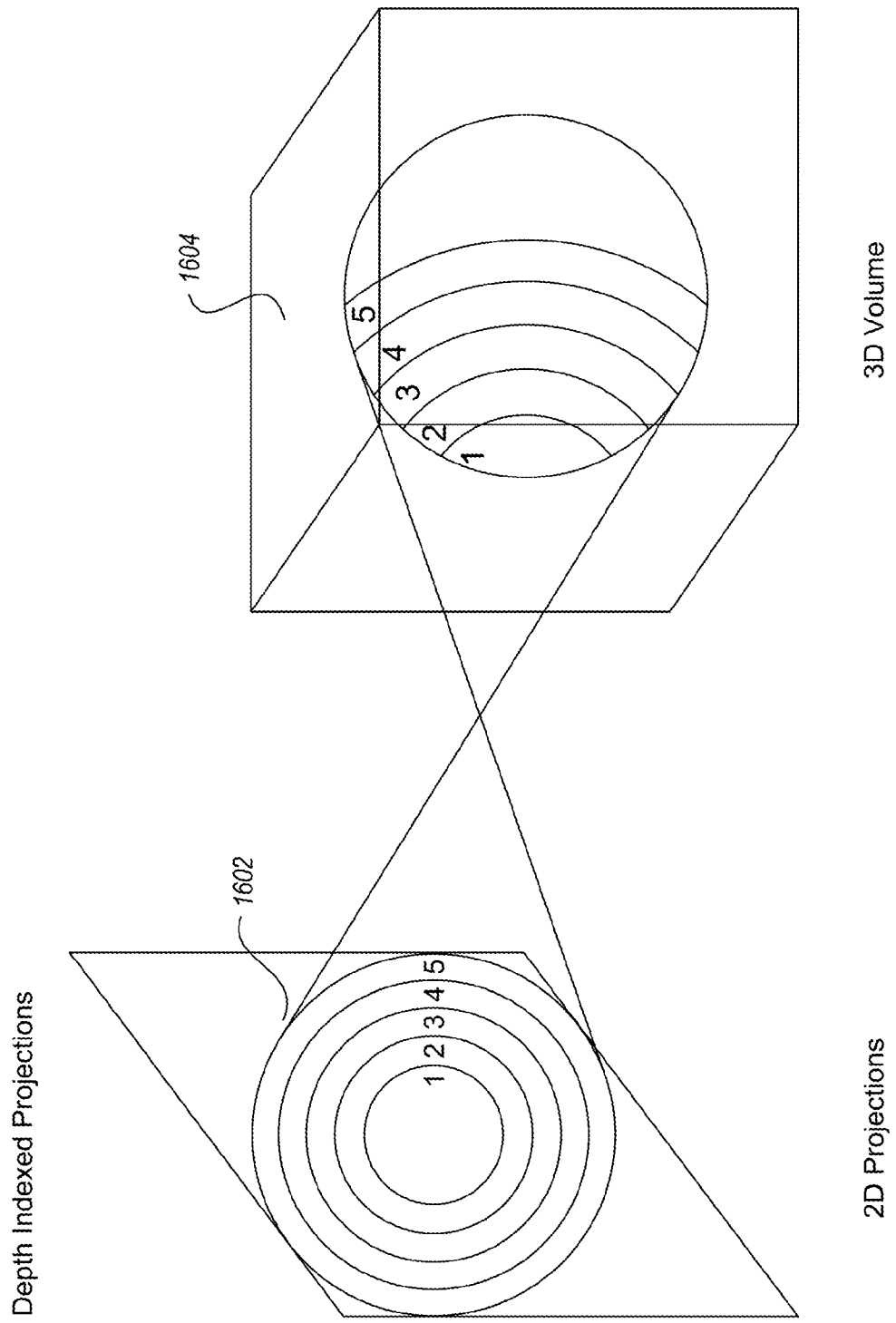
FIG. 16 shows an example of depth indexing of a two-dimensional light field.

If a 2D light pattern 1602 is generated that corresponds to the radial pinhole projections of the entire virtual 3D volume 1604 in a time sequential manner, and each of the points in the 2D field are depth indexed, for example, as shown in FIG. 16, then as shown in FIG. 8, a z-axis optical coupler 562 (FIG. 9) can be equipped with optical gates 522 that are synchronized with the beam deflector 550 to sort the light beams from a multiplexed input cone 542 into multiple output channel cones 572 (only one called out in FIG. 8 for clarity of drawing) that correspond to each of the depth plane in the virtual 3D volume 1604.

In the series method for driving the different 2D wave guide, plane, set or layers 506 of the 2D array 502 discussed above, the 2D array 502 is driven by a single single-mode fiber 514, 548, and the light cones 572 that correspond to the different 2D wave guide, plane, set or layers 506 are generated within the device itself. The light angles should be simultaneously created and sorted, one angle at a time. If the light angles are not created in a time sequential manner, the light angles cannot easily be sorted into each of the 2D wave guide, plane, set or layers 506.

Mathematical Observations

Figure 4:
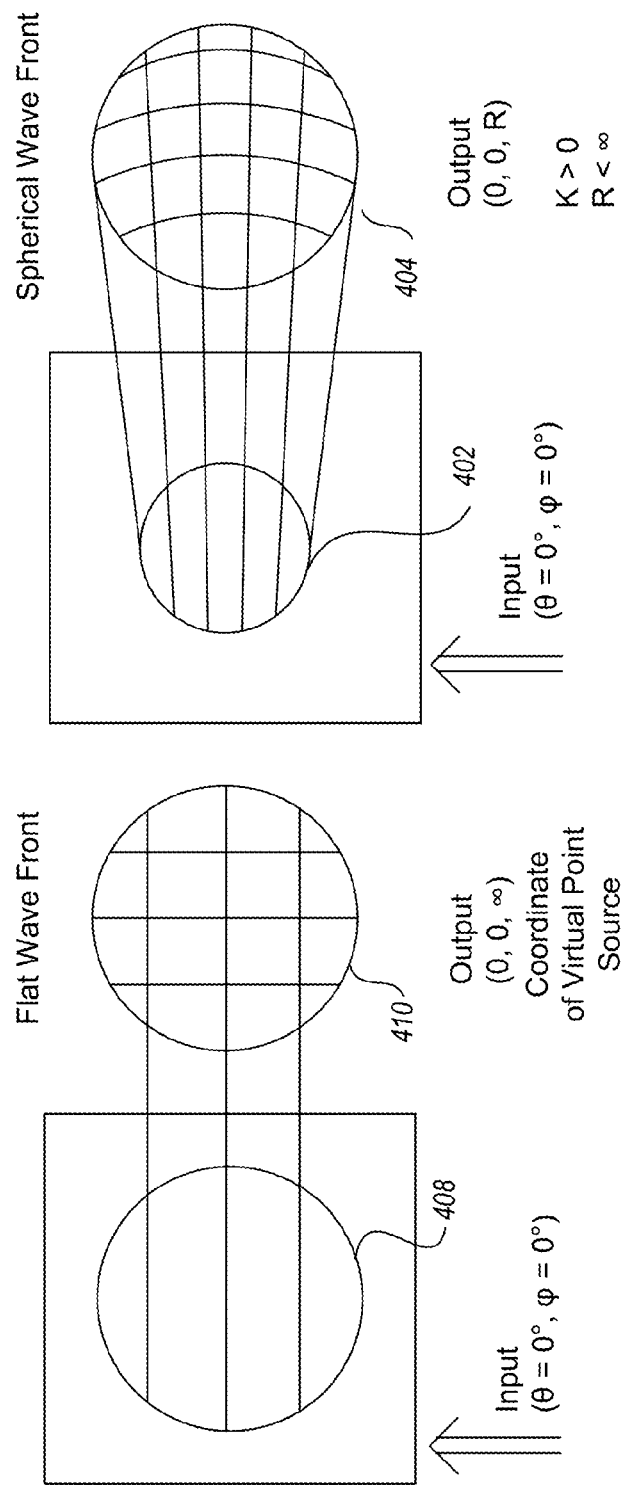
FIG. 4 illustrates example flat and spherical wave fronts.
Figure 12:
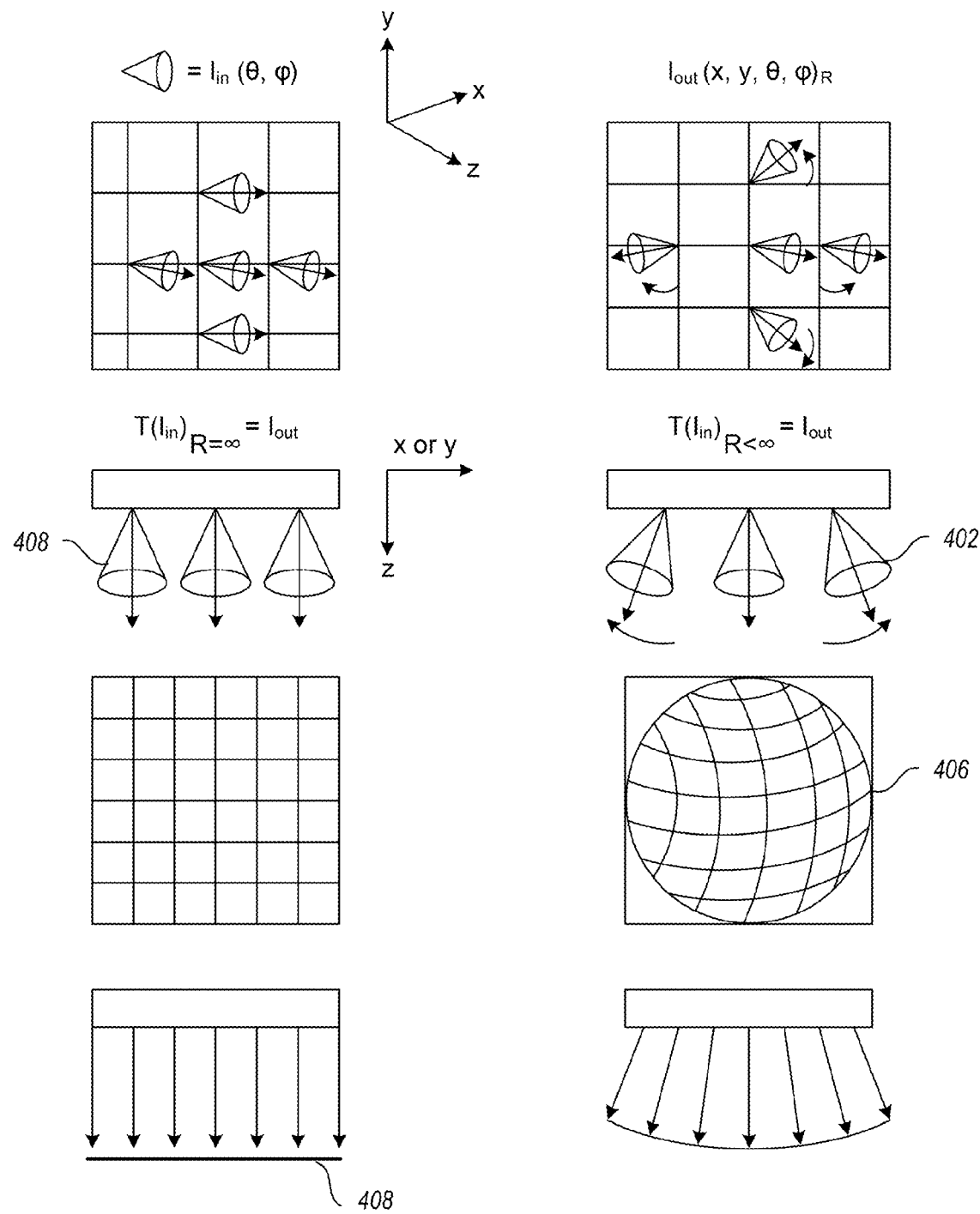
FIG. 12 is an example illustration of how a three-dimensional volume is generated from a stack of two-dimensional projections.

The optical apparatus 500 can be viewed as a mathematical operator that transforms 2D light fields into 4D light fields. FIG. 4 shows example details of the transformation. The optical apparatus 500 performs the transformation by applying a positive curvature to each of the light beams in an input cone 402 and mapping 406 a 2D array of differentially rotated copies of the modified light cone onto a surface of a display. These operations are physically generated by the array(s) of micro-reflectors 540 and have the effect of transforming narrow, plane wave light beams into wide, spherical wave fronts 404; converting light cones into virtual depth planes; and generating a 3D volume from a stack of two dimensional projections, as shown in the example of FIG. 12. (For comparison, FIGS. 4 and 12 also show an input cone 408 generated into a flat wave front 410.) FIG. 13 shows a coordinate system 1300 for virtual object points. FIG. 14 shows a coordinate system 1400 for a 4D light field on a display surface. FIG. 15 shows a coordinate system 1500 for two-dimensional micro-reflector orientations.

Figure 19:
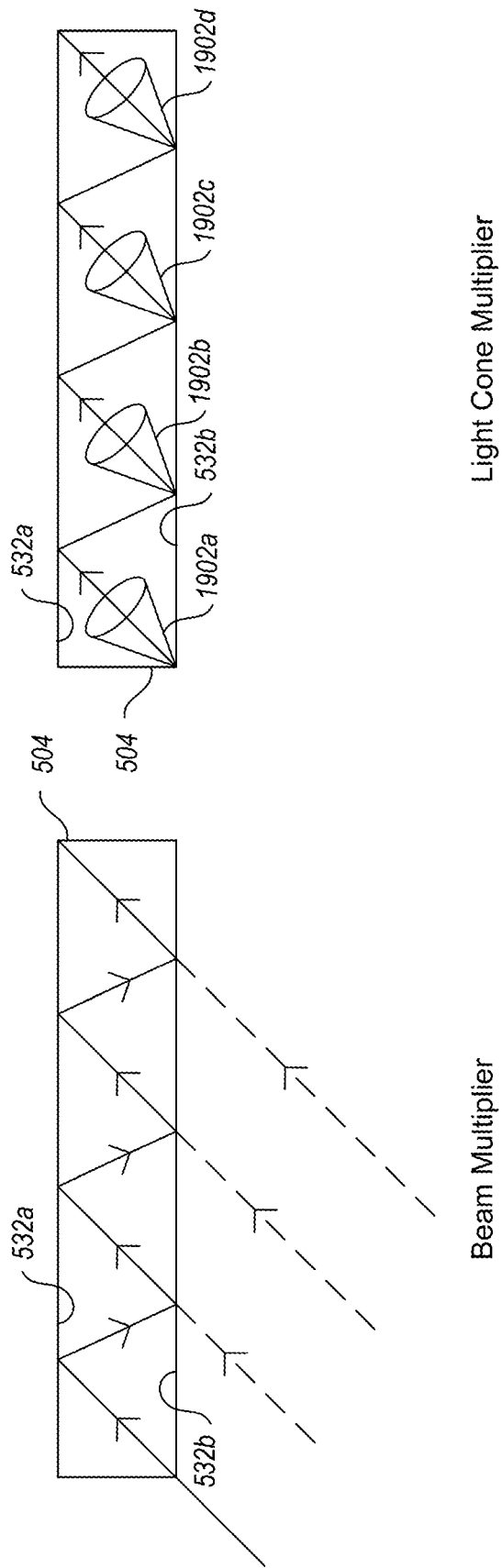
FIG. 19 illustrates an example wave guide tube that generates a wide two-dimensional array of light beams from a single, narrow light beam.

Within the context of the optical apparatus 500, linear or rectangular wave guides 504 function as beam multipliers and wideners that mathematically and physically generate a wide 2D array of light beams based on the input of a single, narrow light beam. FIG. 19 illustrates how a light cone 1902a-1902d (collectively 1902) is multiplied through the use of multiple beam splitters that transmit a portion of incident light and reflect a portion of the incident light.

Example System Specifications

The micro-reflectors (e.g., curved micro-reflectors 504) should be partially transparent and perform the function of a beam splitter as well as a reflector. In this way, a single beam of light having a narrow range of angles can be repeatedly multiplied and redistributed through the array to create a wide 4D light field.

Further, the reflectances of the reflective surfaces (e.g. 532) of the wave guides (e.g., linear or rectangular wave guides 504) and the micro-reflectors (e.g., curved micro-reflectors 504) should be angle specific. Specifically, the micro-reflectors (e.g., curved micro-reflectors 504) should only reflect the angular modes of the input cone that are internally reflected from the surface (e.g., 532) of the wave guide (e.g., linear or rectangular wave guides 504), and should be transparent to all other angular modes. Each wave guide (e.g., linear or rectangular wave guides 504) should only be transparent to the angular modes which are reflected from the micro-reflectors (e.g., curved micro-reflectors 504) and should confine all other angular modes to the interior of the wave guide (e.g., linear or rectangular wave guides 504). This allows the light from the input cone to be distributed throughout the entire length of the wave guide (e.g., linear or rectangular wave guides 504) and to be coupled to each of the micro-reflectors (e.g., curved micro-reflectors 504) before being projected out of the 2D array 502. This also prevents light from striking the micro-reflectors (e.g., curved micro-reflectors 504) from two opposing surfaces (e.g., 532) in the wave guides (e.g., linear or rectangular wave guides 504), which would result in the creation of a dual set of images instead of a single set of images.

Figure 7:
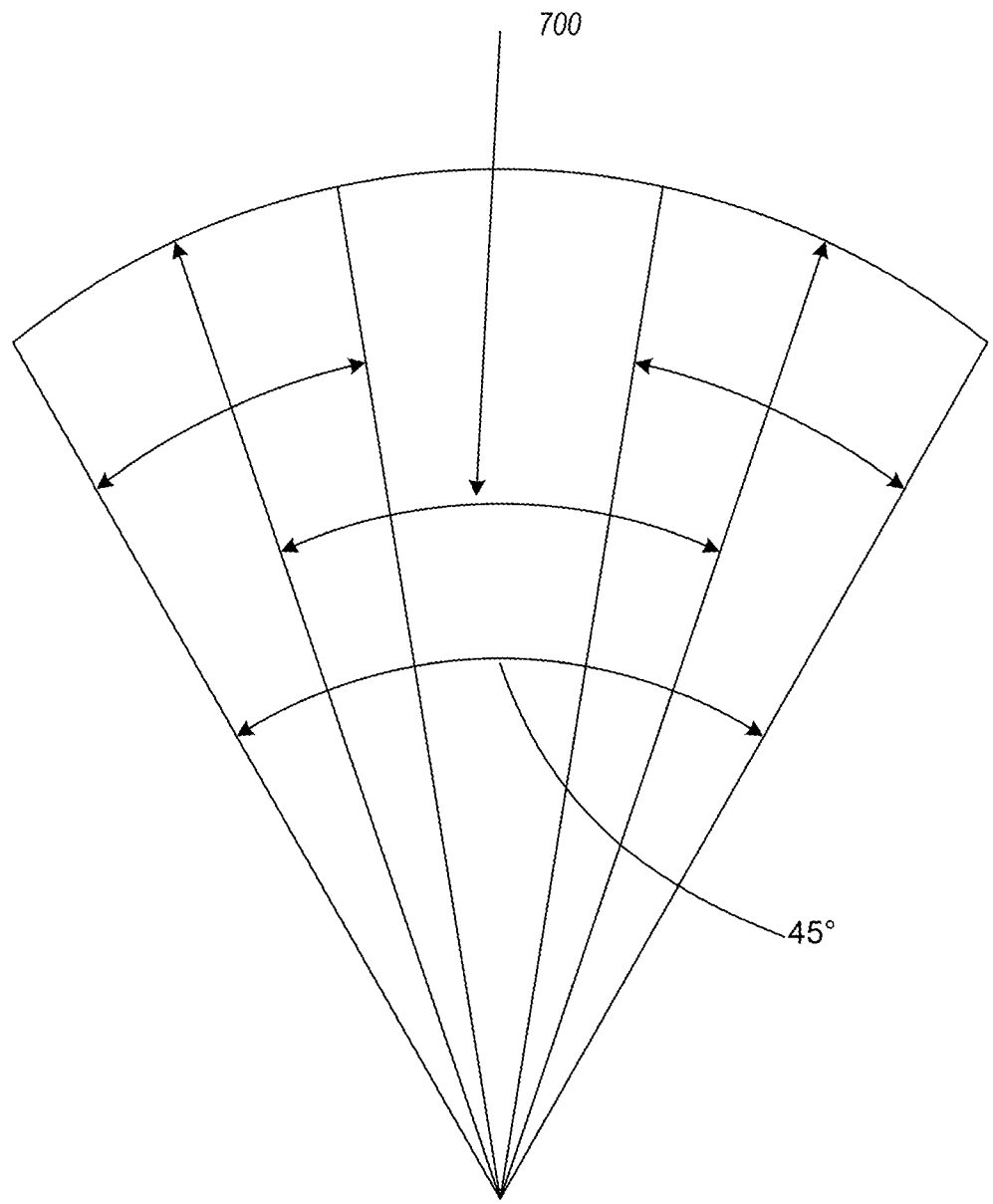
FIG. 7 shows an example of a reduced projection cone resulting from curved micro-reflectors.

This may restrict the field of view. For example, this may restrict the field of view to a maximum field of view (FOV) 700 (FIG. 7) of 45 degrees. Of the total possible 360 degrees of angles that can propagate in the wave guide, half of those angles (180 degrees) are propagating in the wrong direction (out of, instead of into the wave guide), another 45 degrees correspond to the field of view that is projected out by the micro-reflectors, and a further 45 degrees correspond to the angularly shifted light cone that is propagated by the wave guide before the light cone strikes the micro-reflectors. The remaining 90 degrees do not appear useable because these angles may create aliasing effects from the secondary reflections off the outer wave guide surface, as shown in FIG. 6. In practice, the field of view 700 of the optical apparatus 500 will be less than 45 degrees to accommodate the beam curvature that is produced by the micro-reflectors 540, as shown in FIG. 7.

Figure 20:
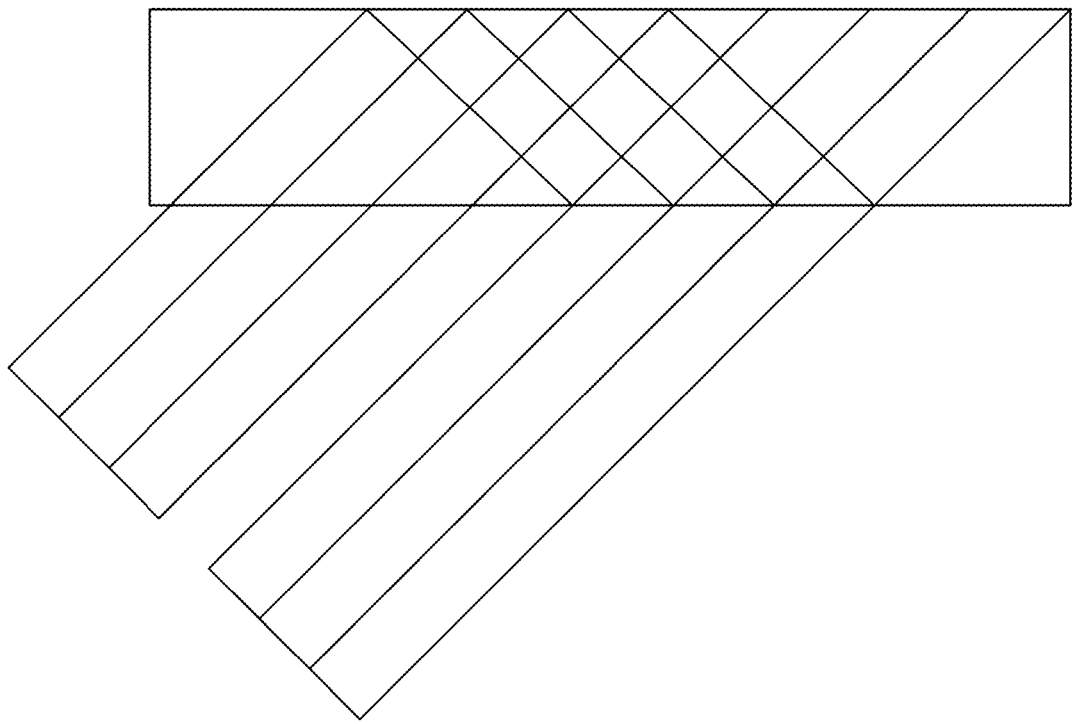
FIG. 20 shows an example of a light beam that must be sufficiently wide to minimize gaps in a light beam array.

The light beams that are coupled into the linear or rectangular wave guides 504 should be wide enough so that the micro-reflectors 540 are evenly covered by the light beams, and gaps and irregularities in the output are minimized. FIG. 20 shows an example where the width of the light beam 2002 is not wide enough to prevent gaps in the light beam array.

For the display to function as an augmented reality device, the light from the input cone should be polarized along a single axis, and the micro-reflectors 540 and reflective opposed surfaces 532 of the wave guides 504 should only reflect light that is polarized along the same axis. Furthermore, an exterior side of the display should have an orthogonally polarizing screen (not shown), such as a liquid crystal display, that allows the user to adjust the real-virtual contrast, i.e., the relative light intensities of the real and virtual visual fields. The orthogonally polarizing screen can also orthogonally polarize the light from the real world relative to the polarization axis of the virtual display, thus allowing the light to pass through the display without being affected by the micro-reflectors 540 or reflective opposed surfaces 532 of the linear or rectangular wave guides 504.

Further, any phase differences and incoherence that is brought about by variations in path length, transit time and wavelength should be undetectable by the human visual system.

To be thin enough to be a wearable device, each 2D planar wave guide, column, set or layer 506 of the 2D array 502 should be as thin as possible. For example, in one embodiment with 10 layers, a thickness of approximately 1 mm per layer would work for the wearable device. With a larger number of layers, e.g., 25 to 35, near and far light fields can be fully recreated. However, fewer than 10 or greater than 35 layers can be used.

Figure 10:
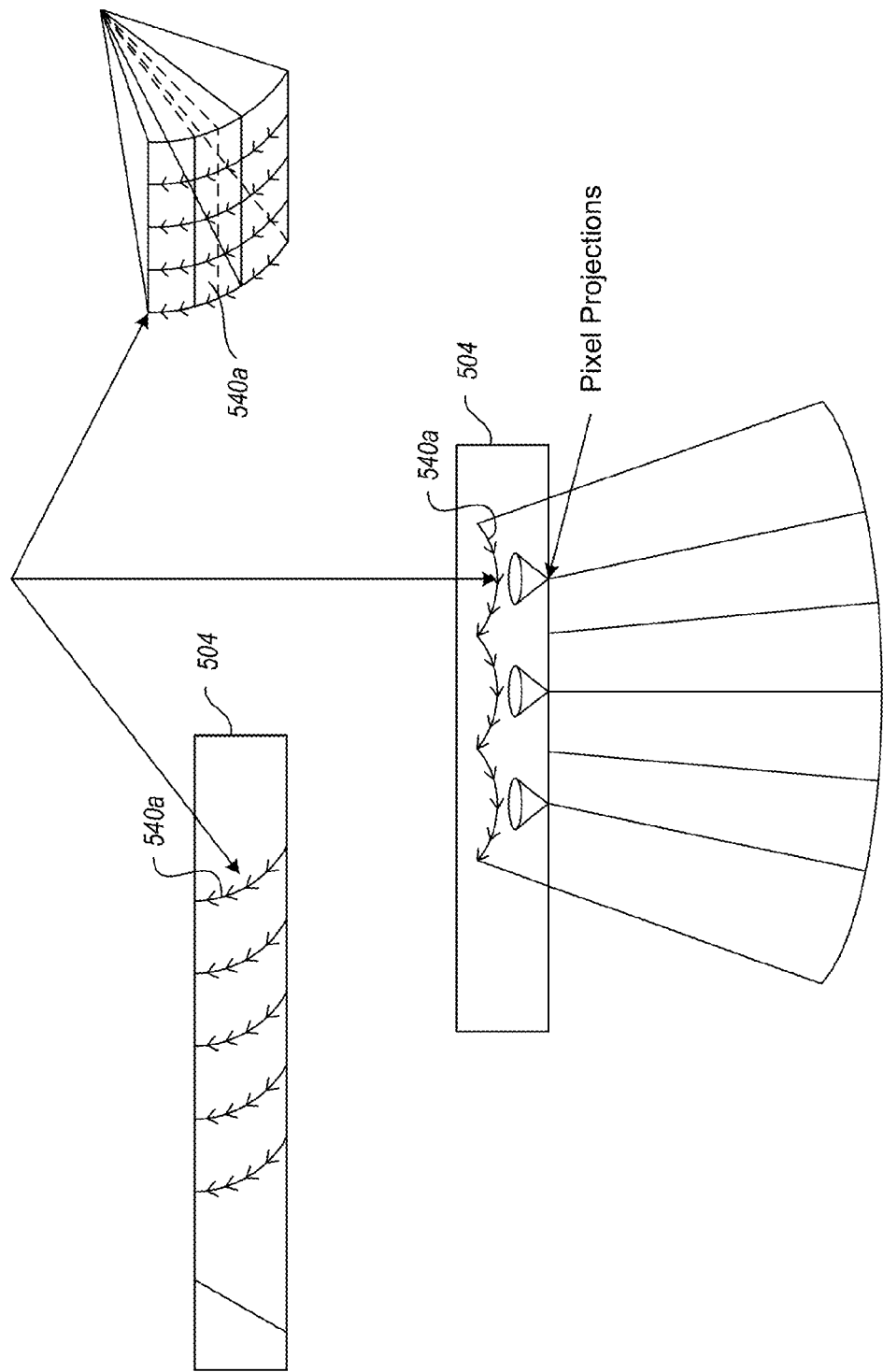
FIG. 10 illustrates the use of deformable reflective surfaces for producing an example wave front.
Figure 17:
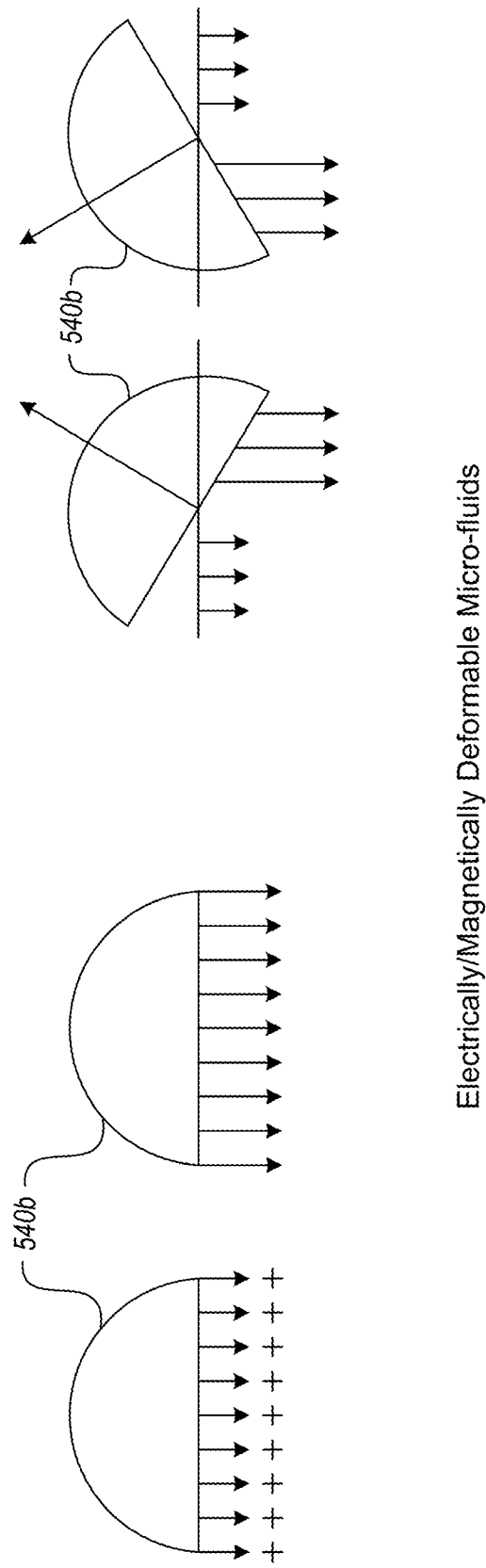
FIG. 17 illustrates an example of deformable micro-fluids used as micro-reflectors.

In some implementations, each 2D planar wave guide, column, set or layer 506 can be reconfigured in real-time, i.e., the curvature(s) of the micro-reflector(s) 504 and/or 2D orientation gradient can be dynamically varied in a rapid manner. Using such an implementation, the projection of each virtual depth layer can be time multiplexed, instead of being presented simultaneously. To do this, a single layer N-plane display system should be reconfigured at a rate N times that of the refresh rate of a single layer in an N-layer system. Dynamically configurable curved micro-reflectors 504a (FIG. 10) may be employed. For example, two dimensional liquid crystal surfaces can be used, where the shapes and orientations of the surfaces can be controlled with electric and/or magnetic fields, as shown in the example of FIG. 10. Alternatively, electrically and/or magnetically deformable microfluids can be used as the micro-reflectors 504b, where the shapes and orientations can be dynamically changed, as shown in the example of FIG. 17.

Figure 11:
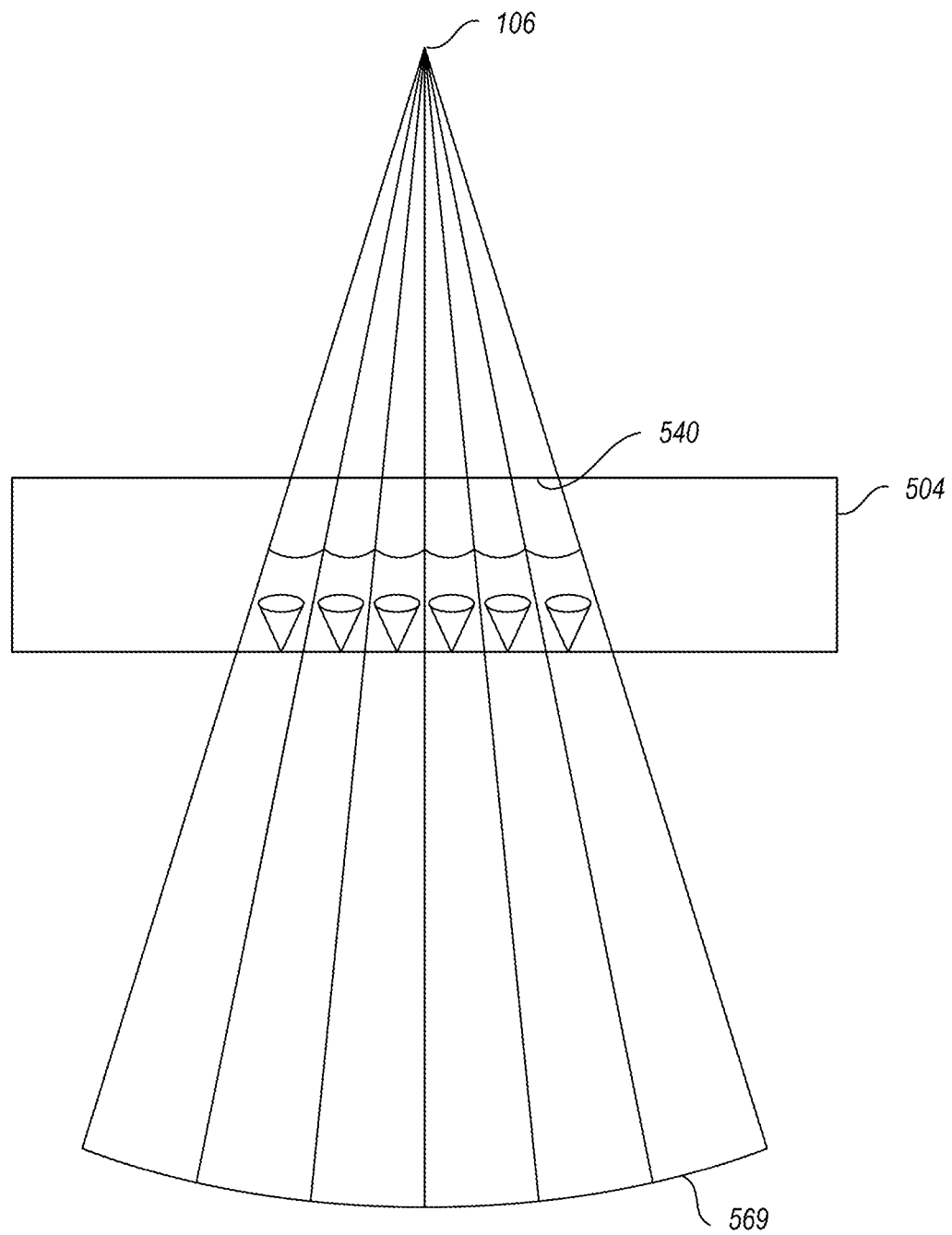
FIG. 11 illustrates an example system that uses transparent display screen with pixels that project light in specified directions.

In some embodiments, transparent display screens whose pixels 540b are able to project light in specified directions can be used to change the direction of the projected light, for instance as shown in the examples of the bottom of FIG. 10 and FIG. 11.

Operating the WRAP

Figure 21:
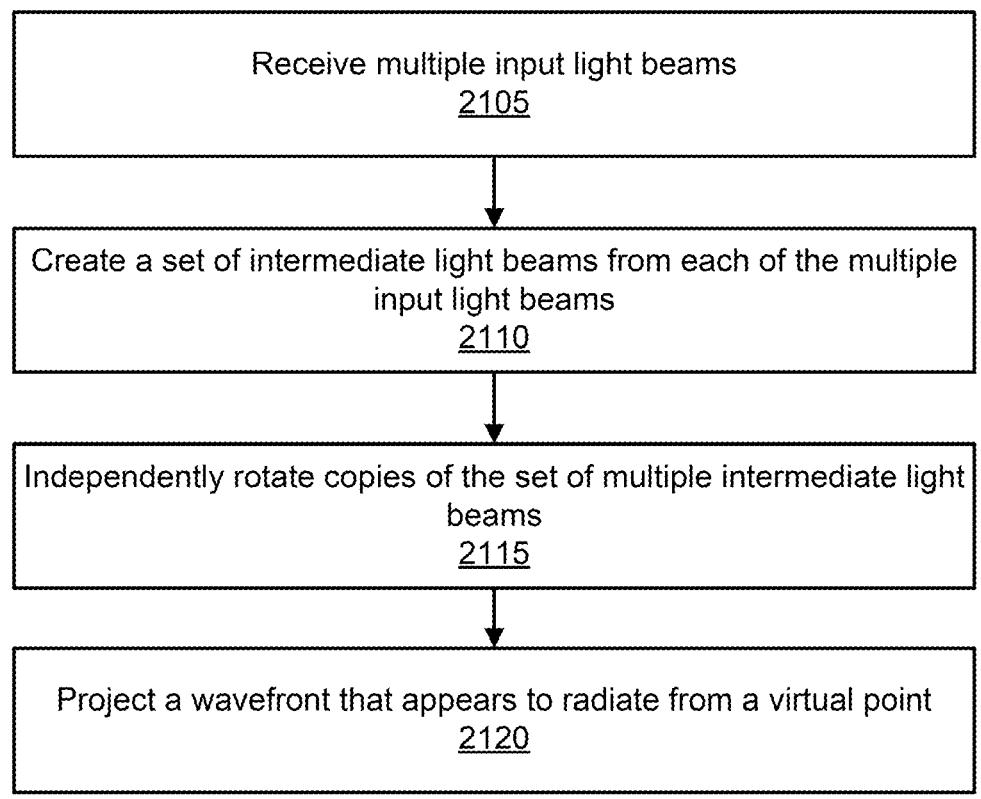
FIG. 21 is a flow diagram illustrating an example process of re-creating a three-dimensional volume on a display by driving a multiple layer wave guide in parallel.

FIG. 21 is a flow diagram illustrating an example process 2100 of re-creating a three-dimensional volume on a display by driving a multiple layer wave guide in parallel. At block 2105, the optical apparatus 502 receives multiple input light beams. Each of the multiple light beams can be delivered by a multi-mode optical fiber. Each of the multiple input light beams corresponds to an intensity pattern of a portion of a visual field in a different layer of the three-dimensional volume to be recreated.

Then at block 2110, the system creates a set of intermediate light beams from each of the multiple input light beams.

Next, at block 2115, the system independently rotates copies of the set of multiple intermediate light beams, and at block 2120, projects a wave front that appears to radiate from a virtual point. All of the projected wave fronts together recreate the 3D volume for viewing by the user.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention.

U.S. Patent Application No. 61/658,355, filed Jun. 11, 2012 is incorporated herein by reference in its entirety.

I claim:

1. A wave guide reflector array projector apparatus, comprising:
    a first planar set of a plurality of rectangular wave guides, each of the rectangular wave guides in the first planar set having at least a first side, a second side, a first face, and a second face, the second side opposed to the first side along a length of the rectangular wave guide, at least the first and the second sides forming an at least partially internally reflective optical path along at least a portion of the length of the rectangular wave guide, and each of the rectangular wave guides in the first planar set including a respective plurality of curved micro-reflectors disposed between the first and the second sides at respective positions along at least a portion of the length of the respective rectangular wave guide to partially reflect a respective portion of a spherical wave front outwardly from the first face of the respective rectangular wave guide; and
    at least a second planar set of a plurality of rectangular wave guides, each of the rectangular wave guides in the second planar set having at least a first side, a second side, a first face, and a second face, the second side opposed to the first side along a length of the rectangular wave guide, at least the first and the second sides forming an at least partially internally reflective optical path along at least a portion of the length of the rectangular wave guide, and each of the rectangular wave guides in the second planar set including a respective plurality of curved micro-reflectors disposed between the first and the second sides at respective positions along at least a portion of the length of the respective rectangular wave guide to partially reflect a respective portion outwardly from the first face of the respective rectangular wave guide,
    the second planar set of rectangular wave guides arranged laterally from the first planar set of rectangular wave guides along a first lateral (Z) axis, the first lateral axis perpendicular to a longitudinal axis (X), the longitudinal (X) axis parallel to the lengths of the rectangular wave guides of at least the first and the second planar sets.

2. The wave guide reflector array projector apparatus of claim 1 wherein the rectangular wave guides in each of the first and at least the second planar set are arranged laterally along a second lateral (Y) axis, the second lateral (Y) axis orthogonal with respect to the first lateral and the longitudinal axes.

3. The wave guide reflector array projector apparatus of claim 1 wherein the first faces of the rectangular wave guides of the second planar set are parallel to the first faces of the rectangular wave guides of the first planar set.

4. The wave guide reflector array projector apparatus of claim 1 wherein the second planar set of wave guides is immediately adjacent the first planar set of wave guides.

5. The wave guide reflector array projector apparatus of claim 1, further comprising:
    a plurality of additional planar sets of wave guides, the first, the second and the plurality of additional sets of wave guide arranged as respective layers in a stack along the first lateral (Z) axis.

6. The wave guide reflector array projector apparatus of claim 5 wherein for each of the first, the second and the additional planar sets of the rectangular wave guides that comprise the respective first, the second and the additional planar sets, the rectangular wave guides are stacked along the second lateral (Y) axis immediately adjacent to successive ones of one another.

7. The wave guide reflector array projector apparatus of claim 6 wherein the rectangular wave guides in each successive one of the first, the second, and the additional planar sets of rectangular wave guides are stacked along the first lateral (Z) axis immediately adjacent to successive ones of one another.

8. The wave guide reflector array projector apparatus of claim 5, further comprising:
a set of a plurality of second lateral (Y) axis distribution optical couplers, each of the second lateral (Y) axis distribution optical couplers in the set optically coupled to provide a respective optical path to a respective one of the first, the second, and the additional planar sets of the plurality of rectangular wave guides.

9. The wave guide reflector array projector apparatus of claim 8, further comprising:
a first lateral (Z) axis distribution coupler having a first end, a second end spaced from the first end along a length of the first lateral (Z) axis distribution coupler, and a plurality of at least partially reflective elements that provide an optical path between the first end of the lateral axis distribution coupler and a respective one of the second lateral (Y) axis distribution couplers of the set of the plurality of second lateral (Y) axis distribution couplers.

10. The wave guide reflector array projector apparatus of claim 9 wherein the at least partially reflective elements of the first lateral (Z) axis distribution coupler comprise a number of optical gates, and further comprising:
at least one light source, the at least one light source operable to emit red, green and blue pixel patterns;
an intensity modulator operable to modulate an intensity of the red, green and blue pixel patterns to produce modulated red, green and blue pixel patterns;
a beam deflector, the beam deflector optically coupled between the at least one light source and the set of a plurality of second lateral (Y) axis distribution optical couplers and operable to deflect the modulated red, green and blue pixel patterns, and wherein the optical gates are controlled to operate in synchronization with the beam deflector; and
an input fiber optically coupled to the first lateral (Z) axis distribution coupler at least proximate the first end thereof to provide intensity modulated beam deflected pixel patterns as an input cone of light representative of at least a portion of an image to be projected via the wave guide reflector array projector apparatus.

11. The wave guide reflector array projector apparatus of claim 8, further comprising:
a plurality of input fibers optically coupled to respective ones of the second lateral (Y) axis distribution couplers to provide an input cone of light representative of at least a portion of an image to be projected via the wave guide reflector array projector apparatus.

12. The wave guide reflector array projector apparatus of claim 1 wherein for each of the rectangular wave guides the plurality of curved micro-reflectors are aligned in a linear array.

13. The wave guide reflector array projector apparatus of claim 1 wherein the curved micro-reflectors are oriented to reflect a portion of light from the first face of the respective rectangular wave guide in a spherical wave front.

14. The wave guide reflector array projector apparatus of claim 1 wherein the curved micro-reflectors are oriented to each reflect a conical projection of rays from the first face of the respective rectangular wave guide to form a respective portion of a spherical wave front.

15. The wave guide reflector array projector apparatus of claim 1 wherein the curved micro-reflectors are each oriented at a respective angle about a second lateral (Y) axis to reflect a portion of light from the face of the respective rectangular wave guide in a spherical wave front, the second lateral (Y) axis orthogonal to the first lateral (Z) axis and the longitudinal (X) axis.

16. The wave guide reflector array projector apparatus of claim 15 wherein for each of at least some of the rectangular wave guides the respective angle about the second lateral (Y) axis for each of the respective curved micro-reflectors is greater than the respective angle of an immediately preceding one of the respective curved micro-reflectors as the longitudinal (X) axis is traversed.

17. The wave guide reflector array projector apparatus of claim 1 wherein the curved micro-reflectors are each oriented at a respective angle about the longitudinal (X) axis to reflect a portion of light from the first face of the respective rectangular wave guide in a spherical wave front.

18. The wave guide reflector array projector apparatus of claim 1 wherein the curved micro-reflectors are each oriented at both a respective first angle about a second lateral (Y) axis and a respective second angle about an axis that is perpendicular to a plane in which the respective first angle lies to reflect a portion of light from the face of the respective rectangular wave guide in a spherical wave front, the second lateral (Y) axis orthogonal to the first lateral (Z) axis and the longitudinal (X) axis.

19. The wave guide reflector array projector apparatus of claim 1 wherein the curved micro-reflectors are each oriented at a respective angle about both of at least two different axes to refocus infinity focused light at specific radial distances.

20. The wave guide reflector array projector apparatus of claim 1 wherein the curved micro-reflectors are each oriented to reflect light received via an end of the respective rectangular wave guide out of the first face of the respective rectangular wave guide, where the first face through which the light is reflected outwardly of the respective rectangular wave guide is perpendicular to the end via which the light is received.

21. The wave guide reflector array projector apparatus of claim 20 wherein the curved micro-reflectors reflect the light outwardly from the respective rectangular wave guide along respective radial axes (R) which are oriented at respective angles with respect to first face from which the light is reflected outward.

22. The wave guide reflector array projector apparatus of claim 21 wherein at least some of the respective radial axes (R) are oriented at both a respective first non-perpendicular angle and a respective second non-perpendicular angle with respect to the first face from which the light is reflected outward, the first and the second non-perpendicular angles being non-planar with one another.

23. The wave guide reflector array projector apparatus of claim 22 wherein the rectangular wave guides arranged laterally successively with one another along the first lateral (Z) axis are at least partially transmissive of light reflected from the curved micro-reflectors of one another in at least one direction.

24. The wave guide reflector array projector apparatus of claim 23 wherein the rectangular wave guides arranged laterally successively with one another along the first lateral (Z) axis are at least partially transmissive of light reflected from the curved micro-reflectors of one another in only one direction.

25. The wave guide reflector array projector apparatus of claim 23 wherein the rectangular wave guides arranged laterally successively with one another along the second lateral (Y) axis are not transmissive of light reflected from the curved micro-reflectors of one another.

26. The wave guide reflector array projector apparatus of claim 1 wherein for at least some of the rectangular wave guides, the plurality of curved micro-reflectors each have a respective first radius of curvature, the first radius of curvature for at least one of the curved micro-reflectors different from the first radius of curvature of at least another one of the curved micro-reflectors of the respective rectangular wave guide.

27. The wave guide reflector array projector apparatus of claim 1 wherein for at least some of the rectangular wave guides, the plurality of curved micro-reflectors each have a respective first radius of curvature about a first axis and a respective second radius of curvature about of second axis, the second axis not collinear with the first axis.

28. The wave guide reflector array projector apparatus of claim 27 wherein for at least some of the rectangular wave guides, the respective first and the respective second radii of curvature of at least one of curved micro-reflectors is different from the respective first and the respective second radii of curvature of at least a second one of the curved micro-reflectors of the respective rectangular wave guide.

29. The wave guide reflector array projector apparatus of claim 27 wherein for each of the rectangular wave guides, at least one of the first side, the second sides, the first face or second face substantially retain a first set of angular modes in the rectangular wave guide and substantially pass a second set of angular modes from the rectangular wave guide, and the respective curved micro-reflectors of the rectangular wave guide substantially reflect the second set of angular modes and substantially pass the first set of angular modes to traverse along the length of the respective rectangular wave guide.

30. An optical apparatus, comprising:
a two dimensional array of a plurality of wave guides arranged in a plurality of rows and columns, each of the wave guides having a first end, a second end spaced from the first end along a length of the wave guide, at least a first pair of opposed sides which are at least partially reflective toward an interior of the wave guide to reflect light along the length of the wave guide, the length which defines a major axis of the respective wave guide, each of the wave guides having a plurality of curved micro-reflectors disposed at respective positions along the length of the respective wave guide and which are at least partially reflective of at least defined wavelengths, the curved micro-reflectors oriented at respective angles with respect to the face of the respective wave guide to provide in conjunction with at least the first pair of opposed sides an optical path that extends between the face and the first end of the wave guide; and
a linear array of column distribution couplers, a respective column distribution coupler for each column of the two dimensional array of the plurality of rectangular wave guides, each of the column distribution couplers having a first end, a second end spaced from the first end along a length of the column distribution coupler, each of the column distribution couplers having a plurality of elements that provide an optical path between the first end of the column distribution coupler and a respective one of the wave guides in the respective column of the two dimensional array of the plurality of wave guides.

31. The optical apparatus of claim 30 wherein each of the wave guides has a rectangular cross section.

32. The optical apparatus of claim 30 wherein the curved micro-reflectors are oriented to reflect a portion of electromagnetic energy from a face of the wave guide.

33. The optical apparatus of claim 30 wherein the curved micro-reflectors are oriented to reflect a portion of electromagnetic energy from a face of the wave guide in a spherical wave front.

34. The optical apparatus of claim 30 wherein the curved micro-reflectors are oriented to each reflect a conical projection of rays from a face of the wave guide to form a respective portion of a spherical wave front.

35. The optical apparatus of claim 30 wherein the curved micro-reflectors are each oriented at a respective angle about a lateral axis of the respective wave guide, the lateral axis perpendicular to the major axis, to reflect a portion of electromagnetic energy from a face of the wave guide in a spherical wave front.

36. The optical apparatus of claim 30 wherein the curved micro-reflectors are each oriented at a respective angle about the major axis to reflect a portion of electromagnetic energy from a face of the wave guide in a spherical wave front.

37. The optical apparatus of claim 30 wherein the curved micro-reflectors are each oriented at a respective angle about both the major axis and about a lateral axis of the respective wave guide, the lateral axis perpendicular to the major axis, to reflect a portion of electromagnetic energy from a face of the wave guide in a spherical wave front.

38. The optical apparatus of claim 30 wherein the curved micro-reflectors are each oriented at a respective angle about both the major axis and about a lateral axis of the respective wave guide, the lateral axis perpendicular to the major axis, to focus infinity focused light at specific radial distances.

39. The optical apparatus of claim 30 wherein the respective plurality of elements of each of the column distribution coupler comprises a linear array of splitters oriented to split at least a portion of light toward a respective one of the wave guides in the respective column of the two dimensional array of the plurality of rectangular wave guides.

40. The optical apparatus of claim 30 wherein each column of the two dimensional array of the plurality of rectangular wave guides forms a respective depth layer of a four dimensional image.

41. The optical apparatus of claim 30, further comprising:
a lateral axis (Z axis) distribution coupler having a first end, a second end spaced from the first end along a length of the lateral axis distribution coupler, and a plurality of at least partially reflective elements that provide an optical path between the first end of the lateral axis distribution coupler and a respective one of the column distribution couplers of the linear array of column distribution couplers.

42. The optical apparatus of claim 41, further comprising:
an input fiber (multiplexed) optically coupled to the lateral axis distribution coupler at least proximate the first end thereof to provide an input cone of light representative of an image to be projected via the optical apparatus.

43. The optical apparatus of claim 42 wherein the at least partially reflective elements of the lateral axis distribution coupler comprise a number of optical gates.

44. The optical apparatus of claim 43, further comprising:
a beam deflector optically coupled between at least one light source and the linear array of column distribution couplers, and wherein the optical gates are controlled to operate in synchronization with the beam deflector.

45. The optical apparatus of claim 44, further comprising:
the at least one light source, which is operable to emit red, green and blue light;
an intensity modulator operable to modulate an intensity of the red, green and blue light; and
a single mode optical fiber optically coupled between the at least one light source and the beam deflector.

46. The optical apparatus of claim 30, further comprising:
a plurality of input fibers (non-multiplexed) optically coupled to respective ones of the column distribution couplers at least proximate the first end of the respective column distribution coupler to provide an input cone of light representative of an image to be projected via the optical apparatus.

47. The optical apparatus of claim 30 wherein the curved micro-reflectors are at least one of dynamically deformable or dynamically orientable about at least one axis in response to at least one control signal.

48. The optical apparatus of claim 47 wherein the curved micro-reflectors comprise curved liquid crystal surfaces.

49. The optical apparatus of claim 30 wherein for each of the columns, the wave guides that comprise the column are stacked along a first lateral axis immediately adjacent to successive ones of one another, the first lateral axis perpendicular to the major axes of the wave guides.

50. The optical apparatus of claim 49 wherein for each of the plurality of rows in the two dimensional array of a plurality of wave guides, the wave guides that comprise the row are stacked along a second lateral axis immediately adjacent to successive ones of one another, the second lateral axis orthogonal with the major axes and the first lateral axes.

51. The optical apparatus of claim 30 wherein for each of the plurality of rows in the two dimensional array of a plurality of wave guides, the wave guides that comprise the respective row are at least partially transmissive of light reflected from the curved micro-reflectors of the wave guides from other columns that comprise the respective row.

52. The optical apparatus of claim 51 wherein each of the columns in the two dimensional array of the plurality of wave guides, the wave guides that comprise the column are not transmissive of light reflected from the curved micro-reflectors of the other wave guides that comprise the respective column.

53. The optical apparatus of claim 30 wherein the curved micro-reflectors are each oriented to reflect light received via the first end of the respective wave guide out of the face of the respective wave guide, where the face through which the light is reflected outwardly of the respective wave guide is perpendicular to the first end via which the light is received.

54. The optical apparatus of claim 30 wherein for at least some of the wave guides, the plurality of curved micro-reflectors each have a respective first radius of curvature, the first radius of curvature for each of the curved micro-reflectors different from the first radius of curvature of each other of the curved micro-reflectors of the respective wave guide.

55. The optical apparatus of claim 30 wherein for at least some of the wave guides, the plurality of curved micro-reflectors each have a respective first radius of curvature about a first axis and a respective second radius of curvature about of second axis, the second axis not collinear with the first axis.

56. The optical apparatus of claim 55 wherein for at least some of the wave guides, the respective first and the respective second radii of curvature of at least one of curved micro-reflectors is different from the respective first and the respective second radii of curvature of at least a second one of the curved micro-reflectors of the respective wave guide.

57. The optical apparatus of claim 30 wherein the curved micro-reflectors allow a portion of light that is not reflected to traverse along the length of the respective wave guide.

58. The optical apparatus of claim 30 wherein for each of the wave guides, at least the first and the second sides substantially retain a first set of angular modes in the wave guide and substantially pass a second set of angular modes from the wave guide, and the respective curved micro-reflectors of the wave guide substantially reflect the second set of angular modes and substantially pass the first set of angular modes to traverse along the length of the respective wave guide.

* * * * *